United States Patent [19]

Ruckebusch

[11] Patent Number: 4,568,829
[45] Date of Patent: Feb. 4, 1986

[54] REAL TIME FILTERING IN NUCLEAR WELL LOGGING AND THE LIKE

[75] Inventor: Guy B. Ruckebusch, Ridgefield, Conn.

[73] Assignee: Schlumberger Technology Corporation, New York, N.Y.

[21] Appl. No.: 413,282

[22] Filed: Aug. 31, 1982

Related U.S. Application Data

[63] Continuation-in-part of Ser. No. 353,228, Mar. 1, 1982.

[30] Foreign Application Priority Data

Jul. 31, 1981 [EP] European Pat. Off. ......... 81401249.8

[51] Int. Cl.⁴ ............................................. G01V 5/00
[52] U.S. Cl. .................................................. 250/256
[58] Field of Search ....................... 250/256, 261, 262

[56] References Cited

U.S. PATENT DOCUMENTS 3,521,064 7/1970 Moran et al. ......................... 250/261
3,976,878 8/1976 Chevalier et al. ................... 250/253

OTHER PUBLICATIONS

Marrett et al., "Shaly Sand Evaluation Using Gamma Ray Spectrometry, Applied to the North Sea Jurassic," *Proc. SPWLA* 17th *Annual Logging Symp.*, Jun. 9, 1976.
Serra et al., "Theory Interpretation and Practical Applications of Natural Gamma Ray Spectroscopy," *Proc. SPWLA* 21st *Annual Logging Symp.*, Jul. 8, 1980.
Ellis, "Correction of NGT* Logs for the Presence of KCl and Barite Muds," *Proc. SPWLA* 23rd *Annual Conference,* Jul. 6-8, 1982.
Schultz et al., "Applications of Digital Filtering Techniques to Nuclear Well Logs," *SPWLA* 22nd *Annual Logging Symp.*, Jun. 23-26, 1981, pp. 1-13.

*Primary Examiner*—Janice A. Howell
*Attorney, Agent, or Firm*—Cooper, Dunham, Clark, Griffin & Moran

[57] ABSTRACT

Disclosed are a method and a system for well logging in which gamma radiation detected in five energy windows is converted into logs of formation thorium, uranium and potassium (Th,U,K), and of borehole barite and potassium chloride (KCl), in a process which makes use of an adaptive filter which accounts for changes in the detected gamma radiation with borehole depth, for the nature of the logging process, and for the composition of the borehole fluid. In a first, simpler embodiment, the filter is based on changes with borehole depth in the total amount of detected gamma radiation in the vicinity of the depth level of interest. In a second, more exacting embodiment, the filter is based on both the vertical variations in the Th,U,K concentrations, and the statistical variations in the measurements. In both embodiments a log of Th,U,K is produced. A third embodiment is based on the second but additionally incorporates the effect of the borehole size and the influence of the gamma ray emitters and absorbers in the borehole fluid on the detected counts of the energy windows. The third embodiment permits the converting of the received radiation information into logs of formation thorium, uranium and potassium, and borehole barite and potassium chloride, by borehole depth. The invention relates to induced as well as natural gamma radiation, and to other types of well logging in which energy windows can be measured.

32 Claims, 14 Drawing Figures

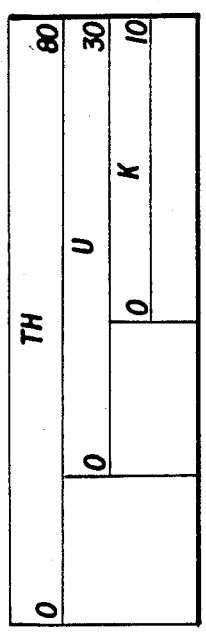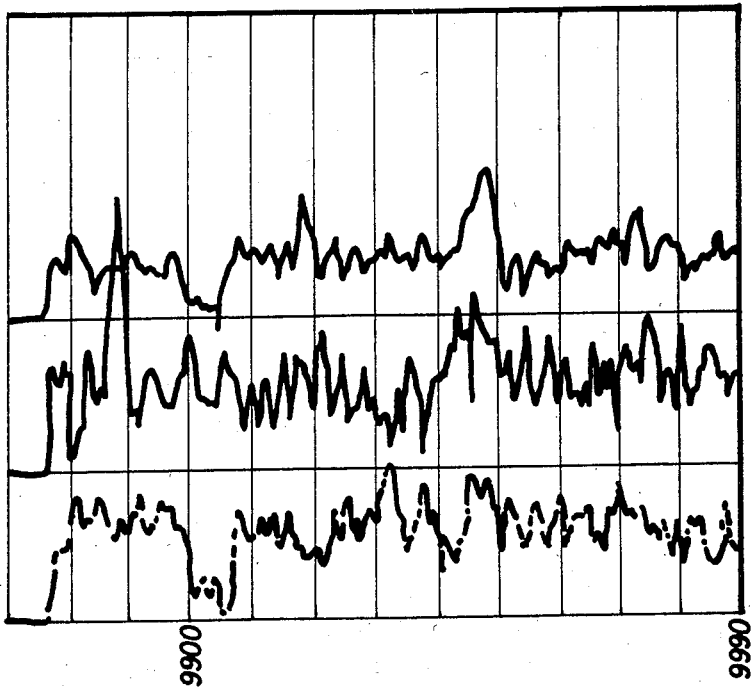
FIG. 7d
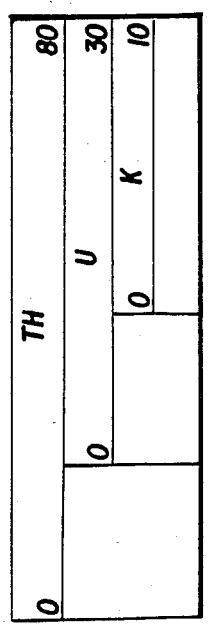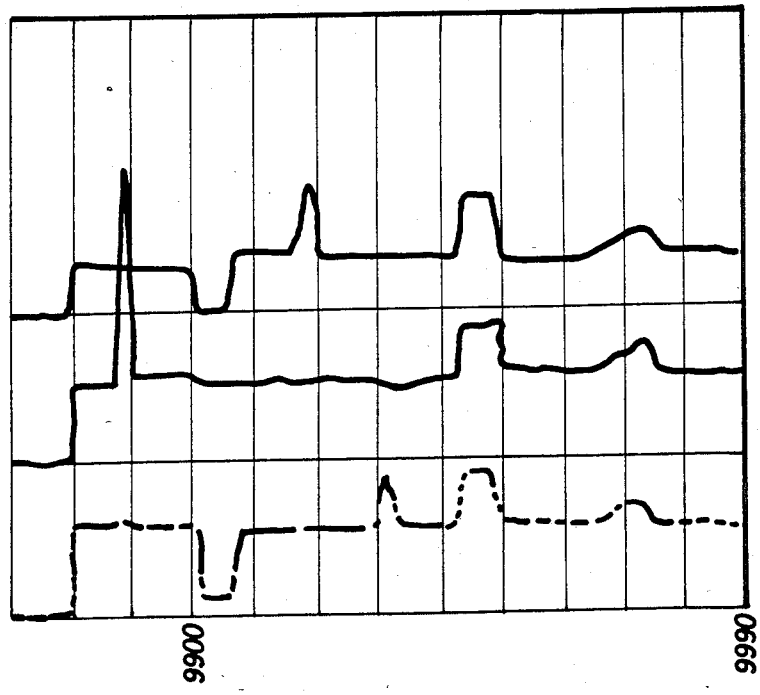
FIG. 7c

REAL TIME FILTERING IN NUCLEAR WELL LOGGING AND THE LIKE

This is a continuation-in-part of co-pending U.S. patent application Ser. No. 353,228 filed Mar. 1, 1982 which is hereby incorporated by reference.

BACKGROUND AND SUMMARY OF THE INVENTION

The invention is in the field of well logging, in which measurements taken in boreholes are used in searching for and exploiting valuable underground resources such as oil and gas. It is particularly directed to a method and a system related to energy windows logs, such as logs of the gamma radiation detected in several energy windows. It is more particularly directed to a method and system for converting energy windows logs into logs of selected subsurface materials such as thorium, uranium and potassium. It is further directed to a method and system which, while converting energy windows logs into subsurface materials logs, corrects for the borehole size and corrects for and produces additional logs of the radiation emitters and absorbers in the borehole fluid. The invention relates to logging natural as well as induced gamma radiation, and to other types of logging in which energy window measurements can be taken, such as sonic logging.

In the example of natural gamma radiation logging, a tool capable of detecting gamma radiation in each respective one of several energy windows passes through a selected borehole interval and measures the gamma ray photons detected in the respective windows in each respective one of a succession of small (e.g., 6-inch) depth intervals. The rays are emitted in the radioactive decay of subsurface materials such as thorium, uranium and potassium, each of which emits with a characteristic energy spectrum. The tool output is converted to a log of the respective emitting materials.

The log of materials such as thorium, uranium and potassium is important in the search for and exploitation of underground resources because it is believed that these materials appear in nature with a discernible relationship to geology and rock morphology. As some nonlimiting examples, it is believed that the ratio of thorium to uranium can be used for determining the geochemical faces in sedimentary rocks, the uranium to potassium ratio can be used to estimate the source rock potential of argillaceous sediments and that the thorium to potassium ratio can be used for determining the mineralogical composition of the shale. Perhaps more importantly, it is believed that by using the thorium, uranium and potassium concentrations either individually or in combination it is possible to measure the presence, type, and volume of shale or clay in the formations surrounding the borehole, which is particularly important in the search for and exploitation of oil and gas deposits.

While it is known that thorium, uranium and potassium emit gamma rays with characteristic discrete energy spectra, it is also known that between their emission and their detection those gamma rays undergo various interactions with the formation, the borehole and the tool and that, consequently, their apparent energy spectra as detected are continuous and have a poor energy resolution. Moreover, the borehole often contains borehole fluid (mud) which includes gamma ray emitters such as potassium chloride and gamma ray absorbers such as barite which affect the count rates detected in the energy windows. Additional uncertainties are introduced by the fact that relatively few gamma ray photons can be detected in the respective energy windows at a given borehole depth because the tool must move through the borehole at a sufficiently high speed to allow drilling or production activities to resume as soon as possible, and by the fact that the tool response changes as a function of borehole size.

Some aspects of known gamma radiation well logging are discussed in Marrett, G. et al., "Shaly Sand Evaluation Using Gamma Ray Spectrometry, Applied to the North Sea Jurassic," Proc. SPWLA 17th Annual Logging Symposium, June 9–12, 1976, and Serra, O. et al., "Theory, Interpretation and Practical Applications of Natural Gamma Ray Spectroscopy," Proc. SPWLA 21st Annual Logging Symposium, July 8–11, 1980, and additional information can be found in Chevalier et al. U.S. Pat. No. 3,976,878 and Moran et al. U.S. Pat. No. 3,521,064. As discussed in the cited documents, all of which are hereby incorporated by reference herein, it is possible to convert the output of a natural gamma radiation logging tool having three or five energy windows into a log of thorium, uranium and potassium concentrations (Th,U,K), in essence by subjecting the tool output to a filter characterized by a $3 \times 3$ or $3 \times 5$ matrix which can be empirically derived—such as by passing the tool through a test borehole containing known concentrations of Th,U,K arranged to approximate the effect of homogeneous beds of infinite depth extent and recording the windows responses. If W designates the radiation detected in five energy windows at a given borehole depth level, i.e., $W = [W1, W2, W3, W4, W5]$, and X designates the thorium, uranium and potassium concentrations at the same depth level, i.e., $X = [Th,U,K]$, then the relationship between the windows measurements W and the concentrations X (when no environmental effects are present) can be described by:

$$W = HX + \epsilon \tag{1a}$$

where H is defined by a $5 \times 3$ tool sensitivity matrix which is unique to a given tool and can be empirically derived by passing the tool through a borehole containing known concentrations of Th,U,K in idealized beds, and $\epsilon = [\epsilon 1, \epsilon 2, \ldots \epsilon 5]$ denotes the statistical errors which are due to the Poisson nature of gamma ray detection. What is of interest normally is the concentrations of Th,U,K as a function of the radiation detected in the windows, and therefore what is of interest is the relationship:

$$X = MW \tag{2a}$$

where M is defined as a $3 \times 5$ matrix relating the concentrations of the three materials to the radiation detected in the five energy windows at a given depth level in the borehole. The matrix M is not the inverse of the matrix H because a nonsquare matrix does not have a direct inverse in the strict sense of the term, but M can be found through a least squares technique relating known concentrations Th,U,K to measured radiation in the five energy windows for given test conditions. Of course the matrix M need be found only once for a given logging tool. In the case of a particular tool (see, e.g.) the Ellis article cited below) the following empirically derived numerical matrices H and M can be used for a standard (8"-diameter, water-filled) borehole:

$$H = \begin{bmatrix} 10.13660 & 21.77220 & 37.47680 \\ 3.27358 & 6.41613 & 16.59690 \\ .61623 & 1.61744 & 7.51860 \\ .32686 & .56565 & .0 \\ .46439 & .16434 & .0 \end{bmatrix} \quad (1b)$$

$$M = \begin{bmatrix} .06184 & .13764 & .004422 & .09079 & 2.46311 \\ .10020 & -.11665 & -.24194 & .28841 & -1.24674 \\ -.01856 & .04096 & .13512 & -.14859 & .04175 \end{bmatrix} \quad (2b)$$

In the known technique, a log of the Th,U,K concentrations is derived by evaluating the relationship (2a) at each depth level in the borehole. Because of the nature of the logging process this estimate of Th,U,K concentrations tends to be noisy, but can be improved by some averaging of the radiation detected in the respective windows over successive borehole depth levels. For example, in order to find the Th,U,K concentrations at a given depth level n in the borehole, the matrix M can be applied to the average of the radiation detected in the five windows for the depth level n and the preceding one, n−1. The average need not be an arithmetic one, and more of the current depth level can be used than the preceding one. More than two depth levels can be averaged, but there is a limit because the consequence of averaging is a loss of resolution in the direction along the borehole axis.

Additional aspects of gamma radiation well logging, especially a method and system for correcting the log of selected gamma radiation emitting subsurface materials for environmental errors introduced by borehole size and by the gamma ray emitters and absorbers found in the borehole fluid, are discussed in Ellis, D., "Correction of NGT Logs for the Presence of KCl and barite Muds", Proc. SPWLA 23rd Annual Conference, July 6–8, 1982 (NGT is a trademark of Schlumberger). As discussed in that document, which is hereby incorporated by reference herein, the gamma radiation emitting subsurface materials logs may be corrected for at least one of: (i) the gamma ray emitter potassium chloride (KCl) in the borehole fluid, and (ii) a gamma ray attenuator (absorber) in the borehole fluid, e.g. barite and/or hematite. Thus the matrix H seen in expression (1b) and the relationship W=HX+ε seen in (1a) may be modified by considering the measurement of window 1 to be affected in a certain manner not only by radiation from the formation gamma ray emitting materials, but also by radiation from the KCl emitter in the borehole fluid, and by absorption (attentuation) by a strong absorber in the same borehole fluid. The measurements in windows 2 and 3 are affected both by radiation from materials in the undisturbed formations and radiation from the KCl in the borehole fluid. The contribution to the measurement in a given window from the KCl in the borehole fluid grows both as a function of borehole size and KCl concentration for both centered and eccentered tools. The contribution W(KCl) to the measurement in a given energy window which is due to KCl in the mud can be represented in the general case as $$W(KCl) = (KCl)a[1 - e^{-b(r-c)}] \quad (3)$$

where a, b and c are constants which can be derived empirically by tests with a given logging tool in test boreholes having known diameters (r, found by a caliper log) and containing mud with known concentrations of KCl. The following relationships govern the lowest three energy windows in the non-limiting example of a particular 5-window logging tool, where W(KCl) is the contribution to the measurement in an energy window due to the borehole fluid KCl, KCl is in percent concentration and r is in inches:

$$\begin{aligned} W_1(KCl) &= (KCl)\,59.86\,(1 - e^{-.046(r-3.62)}) = (KCl)f_1(r) \\ W_2(KCl) &= (KCl)\,22.16\,(1 - e^{-.078(r-3.62)}) = (KCl)f_2(r) \\ W_3(KCl) &= (KCl)\,11.22\,(1 - e^{-.1136(r-3.62)}) = (KCl)f_3(r) \end{aligned} \quad (1c)$$

The relationship between window measurements and Th,U,K concentrations (related by the logging tool sensitivity matrix H) can be corrected for the influence of KCl and B in the borehole fluid by accounting for the effect thereon on the lowest three energy windows, in a relationship described by the following expression:

$$\begin{bmatrix} [W_1 - (KCl)f_1(r)]/B \\ W_2 - (KCl)f_2(r) \\ W_3 - (KCl)f_3(r) \\ W_4 \\ W_5 \end{bmatrix} = [H] \begin{bmatrix} Th \\ U \\ K \end{bmatrix}. \quad (2c)$$

The five unknowns in expression (2c) are the borehole fluid KCl concentration, the B correction and the concentrations of the three materials Th,U,K in the formations surrounding the borehole; and there are five relationships from which to find them.

In view of the known techniques discussed above for gamma radiation well logging and the corrections thereto for borehole fluid absorbers and emitters, and borehole size, one aspect of the invention relates to improving the log of Th,U,K concentrations derived from the radiation measured in five energy windows, based on the recognition that the concentrations log can be filtered not in a fixed manner but adaptively—in accordance with changes with borehole depth in the detected radiation and an understanding of the nature of the logging process. More particularly, this aspect of the invention is based on the discovery that a technique which has at least some characteristic of Kalman filtering can be used in connection with gamma radiation well logging when the nature of the logging process is taken into account in accordance with this invention.

In particular, in accordance with an illustrative and nonlimiting example of the invention, the Th,U,K concentrations log is derived by estimating the concentrations for a given borehole depth level through modifying the concentrations estimate for a previous depth level by an amount determined through applying a filter (constructed for the given depth level) to a combination of: (i) the radiation detected in the five energy windows for the given depth level and (ii) an estimate for the radiation in the five energy windows derived by applying the tool sensitivity matrix to the concentrations estimate for the previous depth level. If the filtered estimate for the Th,U,K concentrations for the current depth level n in the borehole is designated by X(n) and the filtered estimate for a previous depth level is designated by X(n−1), the filter gain for the given depth level is designated by K(n), the radiation detected in the five energy windows for the depth level n is designated by W(n) and the sensitivity matrix characterizing the particular well logging tool is designated by H, then one exemplary process in accordance with the invention can be described by the expression:

$$X(n) = X(n-1) + K(n) [W(n) - HX(n-1)] \quad (4)$$

In a first, simpler and nonlimiting example of the invention, the filter gain K(n) for a particular borehole depth level n is determined by the behavior of the total detected gamma radiation in the vicinity of the depth level n. If the total detected gamma radiation is stable and smoothly varying in the relevant borehole depth interval, then in this example the effect of the adaptive filter gain K(n) approaches that of averaging the energy windows over a substantial borehole depth interval. However, if the total detected gamma radiation is changing significantly in the relevant borehole depth interval, then the gain K(n) approaches the 3×5 empirically derived matrix M discussed above. Stated differently, the filter adapts such that the previous Th,U,K concentrations estimate tends to dominate when the true concentrations at the relevant depth in the borehole are likely to be constant, and the newly measured energy windows tend to dominate otherwise. In a particular example, the gain K(n) can be the matrix M weighted by a scalar K(n) which varies between a value approaching zero and a value approaching unity.

In a second, more exacting but again nonlimiting example, the invention is implemented in a process which again applies a filter in the manner discussed in connection with expression (4) but the filter gain K(n) for a given depth level n is determined by a 3×3 matrix S characterizing the statistical variations in the filtered estimates of the Th,U,K concentrations, a 3×3 matrix Q characterizing the relevant geological noise, the well logging tool sensitivity matrix H, the matrix H transposed to produce a matrix H', and a 5×5 matrix R characterizing the statistical variations in the radiation detected in the five windows (i.e. the noise $\epsilon$). The manner in which said factors determine the filter gain K(n) in this second exemplary embodiment of the invention can be described by:

$$K(n) = (S(n-1) + Q(n-1))H'[H[S(n-1) + Q(n-1)] \cdot H' + R(n)]^{-1} \quad (5)$$

where S is an estimate of statistical variations in the Th,U,K concentration estimates, Q is an estimate of the relevant geological noise and R is an estimate of the statistical variations in the energy window measurements.

In a third embodiment, where environmental effects are present, expression (1a) is modified to take into account the borehole size effect as well as the effect due to the presence of absorbers (e.g. barite) and radioactive emitters (e.g. KCl) in the borehole fluid. In a non-limiting example, where only barite and KCl are present in the borehole fluid, and where the borehole size effect has been modeled according to expression 8 below, expression (1a) is modified as follows:

$$W = H(x)X + \epsilon \quad (6)$$

where H(x) is a corrected sensitivity matrix function of the borehole absorption coefficient x. In turn, $$x = \rho(r - r_{sonde}) \quad (7)$$

where $\rho$ is the density of the mud, r is the diameter of the borehole (measured from a caliper log) and $r_{sonde}$ is the diameter of the sonde. The functional dependence on x of the (i,j)-th element [i=1, 2..., 5; j=1, 2, 3] of the matrix H is given by $$H_{ij}(x) = (\alpha_{ij} + \beta_{ij} e^{-k_{ij}x}) H_{ij} \quad (8)$$

where $H_{ij}$ is the (i,j)-th element of the standard matrix (1b), and $\alpha_{ij}$, $\beta_{ij}$ and $k_{ij}$ are calibration constants which can be found empirically.

The influence of barite and KCl has been modeled by D. Ellis, as noted above. With KCl denoting the concentration of KCl in the borehole fluid and B denoting the barite coefficient (acting as a gamma ray absorber for the first window only), the tool response relationship can be written as:

$$\begin{pmatrix} W1 \\ W2 \\ W3 \\ W4 \\ W5 \end{pmatrix} = (H_B(x)) \begin{pmatrix} Th \\ U \\ K \end{pmatrix} + \begin{pmatrix} f_1(x) \\ f_2(x) \\ f_3(x) \\ 0 \\ 0 \end{pmatrix} KCl + \begin{pmatrix} \epsilon 1 \\ \epsilon 2 \\ \epsilon 3 \\ \epsilon 4 \\ \epsilon 5 \end{pmatrix} \quad (9)$$

where $H_B(x) =$ $$\begin{pmatrix} BH_{11}(x) & BH_{12}(x) & BH_{13}(x) \\ H_{21}(x) & H_{22}(x) & H_{23}(x) \\ H_{31}(x) & H_{32}(x) & H_{33}(x) \\ H_{41}(x) & H_{42}(x) & H_{43}(x) \\ H_{51}(x) & H_{52}(x) & H_{53}(x) \end{pmatrix}$$

and where $f_i(x)$ denotes the influence of 1% of KCl in the mud on the i-th window (there being no influence on windows 4 and 5). The functional dependence of $f_i(x)$ on x is given by $$f_i(x) = a_i(1 - e^{-b_i x})$$

as seen by relationship (3) and its following discussion.

Those skilled in the art will recognize that the third embodiment method for correcting for environmental effects is just a suitable modification of the method of the second embodiment of the invention. Instead of estimating only X=(Th,U,K), the potassium-chloride (KCl) and barite (B) concentrations must also be estimated at each depth. If, for simplicity, it is assumed that KCl and B are constant along the selected borehole interval (the case where KCl and B are slowly varying quantities being but a straightforward variation), and Y is defined as the vector of the (Th,U,K,KCl and B) concentrations, the estimation of Y is performed using the extended Kalman filtering technique, which is well-known by those skilled in the art. The estimate Y(n) of Y at depth n is given by $$Y(n) = Y(n-1) + K(n) [W(n) - G(n)Y(n-1)] \quad (10)$$

where G(n) is the following matrix:

$$\begin{bmatrix} B(n-1)H_{11}(x_n) & B(n-1)H_{12}(x_n) & B(n-1)H_{13}(x_n) & f_1(x_n) & b \\ H_{21}(x_n) & H_{22}(x_n) & H_{23}(x_n) & f_2(x_n) & 0 \\ H_{31}(x_n) & H_{32}(x_n) & H_{33}(x_n) & f_3(x_n) & 0 \\ H_{41}(x_n) & H_{42}(x_n) & H_{43}(x_n) & 0 & 0 \\ H_{51}(x_n) & H_{52}(x_n) & H_{53}(x_n) & 0 & 0 \end{bmatrix} \quad (11)$$

with B(n−1) being the estimate of B at depth n−1, $x_n$ being defined for depth n as the borehole absorption coefficient of relationship (7), and $b = H_{11}(x_n) Th(n-1) + H_{12}(x_n) U(n-1) + H_{13}(x_n) K(n-1)$ [Th(n−1), U(n−1) and K(n−1) being the (Th,U,K) estimates at depth (n−1)].

The gain K(n) is now seen to be a (5×5) matrix given by $$K_n = [S(n-1)+Q(n-1)]G'(n)[G(n)[S(n-1)+Q(n-1)]G'(n)+R(n)]^{-1} \quad (12)$$

where S is a (5×5) matrix which represents the covariance of the statistical variations in the Th,U,K,KCl and B estimates; Q is assumed to be of the following form $$Q = \begin{pmatrix} Q_t & 0 & 0 & 0 & 0 \\ 0 & Q_u & 0 & 0 & 0 \\ 0 & 0 & Q_k & 0 & 0 \\ 0 & 0 & 0 & 0 & 0 \\ 0 & 0 & 0 & 0 & 0 \end{pmatrix} \quad (13)$$

where $Q_t$, $Q_u$ and $Q_k$ are the variances of the geological noises in Th, U,K; and R is an estimate of the statistical variations in the energy window measurements.

In both the second and third embodiments, the log made up of samples (X)n or (Y)n estimated through use of the filter gain referred to in connection with expressions (5) or (12) can be further filtered, in a fixed-lag filter process which takes into account borehole depth levels subsequent to the one currently being processed.

BRIEF DESCRIPTION OF THE DRAWINGS

FIG. 7c illustrates a filtered Th,U,K log produced by a process in accordance with a second exemplary embodiment of the invention from the same energy windows log; and FIG. 7d illustrates a Th,U,K log produced by a prior art process from the same energy windows log.

DETAILED DESCRIPTION

Figure 1:
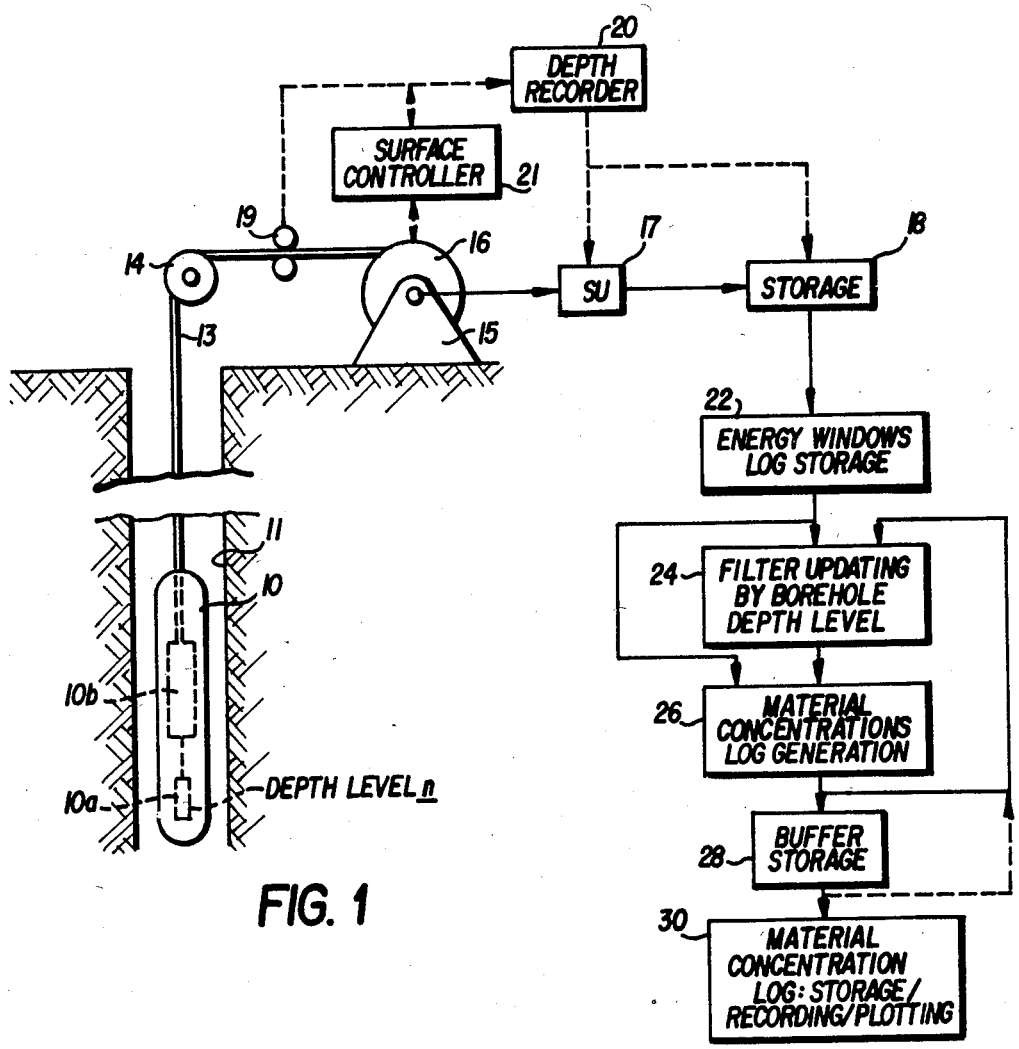
FIG. 1 illustrates an exemplary embodiment of a system in accordance with the invention.

FIG. 1 shows a logging tool 10 in a borehole 11 for investigating subsurface earth formations 12 by deriving a log thereof. In a particular embodiment, tool 10 logs the gamma radiation detected thereby in each of several energy windows, for example five. A particular example of such a tool is designated NGT-A and is described in U.S. Pat. No. 3,976,878. Tool 10 is supported in borehole 11 by a cable 13 which passes over a sheave wheel 14 and is secured to a drum-and-winch mechanism 15. Mechanism 15 includes a suitable brush and slipring arrangement 16 for providing electrical connection between conductors within cable 13 and a unit 17 labelled SU which controls the supply of power and electrical signals to and from tool 10 via cable 13 and readies signals from the tool for application to storage 18. Either or both of units 17 and 18 can include equipment for converting analog signals received from tool 10 into digital signals associated with the respective depth levels n in borehole 11 at which the analog signals have been derived by tool 10, as indicated by wheel 19 which engages cables 13 and is linked with a depth recorder 20, which in turn is linked with either or both of units 17 and 18. Either or both of unit 17 and storage 18 can include additional equipment for preprocessing of logs to prepare them for use in the invented process. Unit 18 can store logs derived by separate measuring devices carried by the same tool 10 in one or more passes through borehole 11, logs derived from separate passes of different tools 10 through borehole 11, and/or logs derived from passes of tool 10 or other similar tools through different boreholes in the same or similar subsurface formations. A surface controller 21 controls the speed and position of tool 10 in borehole 11. The exemplary tool designated NGT-A includes a scintillation detector schematically indicated at 10a which comprises a 12-inch long and 1¾ inch diameter sodium iodide crystal optically coupled to a photomultiplier, and includes electronic circuitry schematically illustrated at 10b which takes the photomultiplier output and determines the amount of gamma rays in each of five energy windows and sends corresponding electrical signals to the surface via conductors in cable 13.

Figure 2:
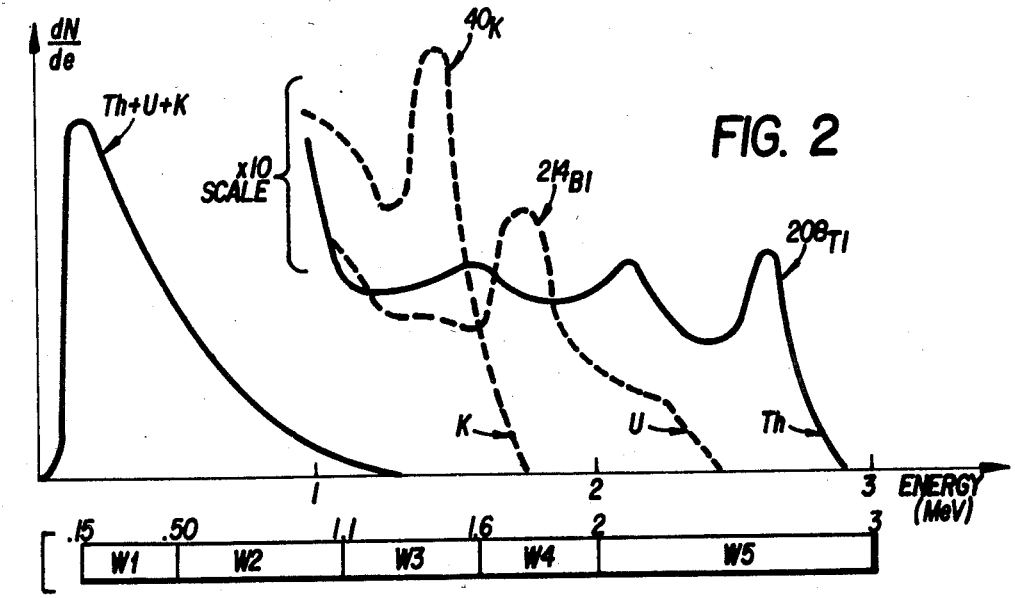
FIG. 2 illustrates a characteristic spectra of thorium, uranium and potassium and the five energy windows of an exemplary logging tool.

One example of the energy range in the energy windows is illustrated in FIG. 2, where the five windows are designated W1, W2, W3, W4, and W5 and the MeV boundries thereof are indicated. The vertical scale is the probability of emission of gamma ray photons, the leftmost curve indicates the spectrum of the total gamma radiation to which the tool is exposed and similarly the appropriately labelled three other curves indicate the potassium, uranium and thorium gamma rays to which the tool is exposed. Of course, FIG. 2 is for an idealized setting and does not take into account factors such as interaction of the emitted gamma rays with the formation surrounding the borehole, the borehole itself and the logging tool, nor does it take into account factors such as the influence of adjacent borehole depth levels on the one of interest at the time.

Referring to FIG. 1, the tool electronics indicated at 10b receive the output of the photomultiplier in the scintillation detector indicated at 10a and perform known pulse amplitude analysis to divide it into the five energy windows indicated in FIG. 2. In principle, the output of the scintillation detector for the time interval, e.g. six inches, is accumulated in each of the five energy windows, and the result is an energy windows log sample of component for the depth level n identifying the short depth interval. A sample or component of the energy windows log thus comprises five measurements, one for each respective one of the energy windows. Thus, sample W comprises measurements [W1,W2,W3,W4,W5]. The sequence of such measurements W, each for a respective successive borehole depth level, makes up the energy windows log. The sample or component of the energy log for a particular depth level n in the borehole is designated W(n).

The energy windows log W for the borehole interval of interest is stored in storage 22, and is used in the remainder of FIG. 1 for conversion into a log of selected gamma radiation emitting materials, such as thorium, uranium and potassium. The storage 22 may also be used to store tool response information and other geological information for the further conversion of energy windows log W into logs of the gamma ray emitters and absorbers in the borehole fluid. The conversion of the energy window log W into selected gamma radiation emitting formation materials logs and borehole fluid gamma ray absorber and emitter logs can be in real time, in which case units 17, 18, and 22 serve only as buffer storage. Alternatively, the conversion can be done by first storing the logs for the entire borehole depth interval of interest, or for a part of it, in one or more units 17, 18 and 22, and thereafter transmitting the log to another location for conversion into a materials, a borehole emitter, and a borehole absorber log. The filter generated at unit 24 for the given borehole depth level is supplied to a unit 26, which also receives the energy windows log and the tool response information from unit 22 and generates from its input a log of the formation materials of interest e.g. a Th,U,K concentration log, and a log of the borehole fluid emitter and absorbers e.g. KCl and B, which affect the readings of energy windows log. A tangible representation of the logs can be temporarily stored in buffer storage 28 and more permanently in a unit 30. Unit 30 can include recording devices such as paper or film log recorders for producing log traces of the Th,U,K,KCl,B log. Filter updating unit 24 generates a respective filter for each depth level in the borehole on the basis of the energy windows log supplied to it from unit 22 and the material concentrations log and borehole fluid gamma ray absorber and emitter concentrations log generated in unit 26, and can additionally use previously generated log samples from buffer storage 28.

In a nonlimiting example of the first, simpler embodiment of the invention, the filter gain found in unit 24 for a given borehole depth n is the matrix M discussed in connection with expressions (2a) and (2b) weighted by a scalar k(n) which varies between zero and unity and is determined for a given borehole depth level n by the manner in which the total detected gamma radiation $\gamma$ changes from one depth level to another in the vicinity of level n. The exact manner in which $\gamma$ controls the filter in this example has been chosen on the basis of discoveries relating to the nature of the logging process, and an example which has been found to produce satisfactory results in practice is to base the weighting scalar k(n) for a particular depth level n on a factor designated C(n), which in turn is based on the following relationship between total gamma radiation $\gamma(n)$ detected at depth level n, total gamma radiation $\gamma(n-1)$ detected at the preceding depth level n−1, the factor C(n−1) found for the preceding depth level n−1, and the constants a and g:

$$C(n) = ag \left| \frac{\gamma(n) - \gamma(n-1)}{\gamma(n) + \gamma(n-1)} \right| + (1-a) C(n-1) \quad (14)$$

If, g is taken as 3, and the term in the absolute brackets when multiplied by g is greater than C(n−1), then a is given a value of 0.8. Otherwise, a=0.125.

The weighting scalar k(n) can then be set as follows:

$$k(n) = C(n) \text{ if } .05 \leq C(n) \leq .6 \quad (15)$$
$$k(n) = .05 \text{ if } C(n) < .05$$
$$k(n) = .6 \text{ if } C(n) > .6$$

In this example of the first, simplified embodiment of the invention, in which K(n)=k(n)M and the product of the matrices M and H is unity, the filtering described in connection with expression (4) above can now be characterized by:

$$X(n) = [1 - k(n)]X(n-1) + k(n)MW(n) \quad (16)$$

It should be appreciated from the discussion in connection with expressions (14), (15), and (16), that at one extreme, when the total detected gamma radiation is stable or changes very slowly in the vicinity of the depth level of interest and thereby indicates a homogeneous zone in the borehole, the weighting scalar k(n) is at its low value of 0.05 and the new filtered estimate of the Th,U,K concentrations is based almost entirely on the filtered estimate for the previous borehole depth level. At the other extreme, when the total detected gamma radiation is changing rapidly in the vicinity of the borehole depth level of interest at the time, the weighting scalar k(n) is at its high value of 0.6 and the previous filtered estimate for the Th,U,K concentrations is de-emphasized in favor of the estimate based entirely on the current measurements of radiation in the five energy windows. In the intermediate range, the balance between the relative weights accorded to the previous filtered estimate of the Th,U,K concentrations and the radiation detected in the five energy windows shifts in favor of the latter with increasing change in the total detected gamma radiation in the vicinity of the borehole depth level of interest.

Figure 3:
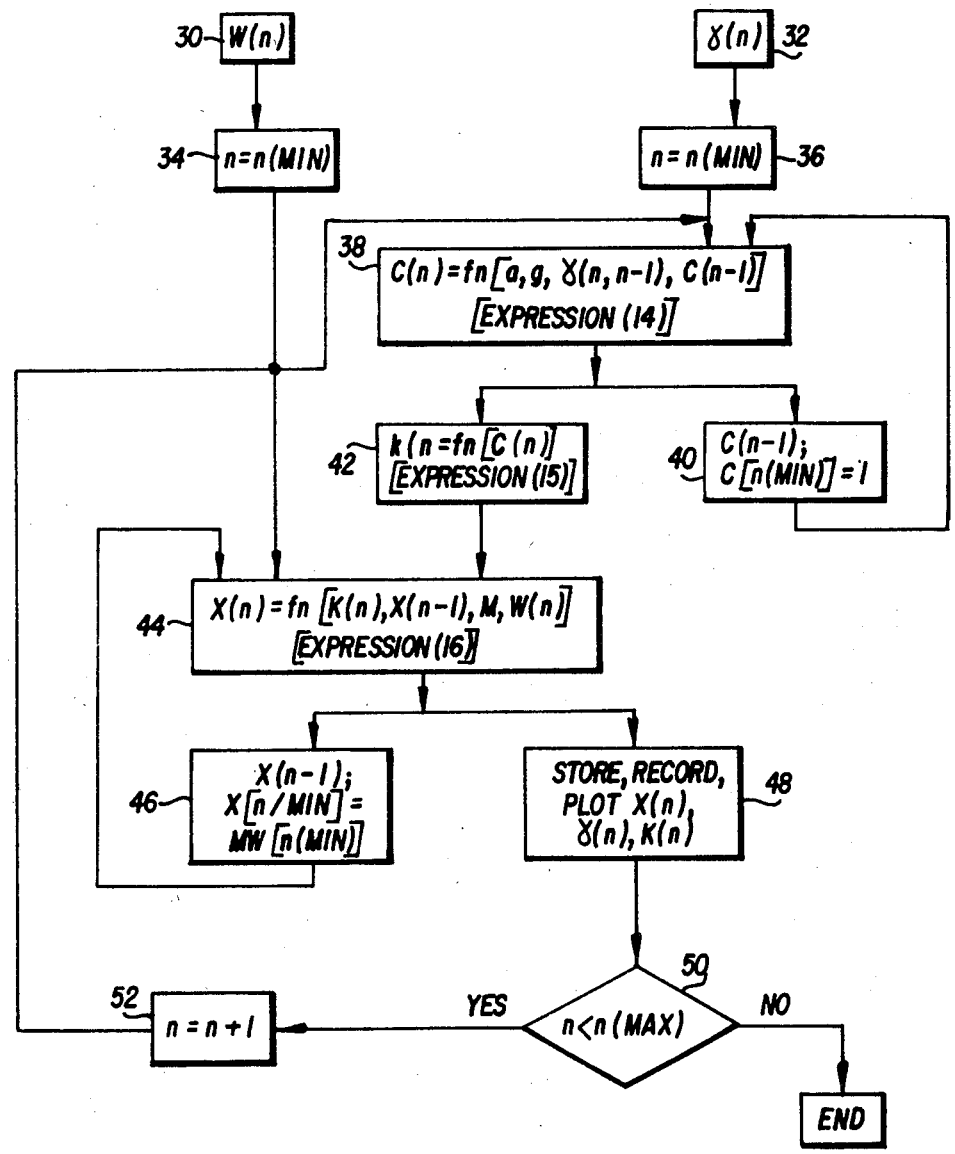
FIG. 3 is a flowchart illustrating a process in accordance with a first, simpler embodiment of the invention.

An exemplary process embodying the above example of the first, simpler embodiment of the invention is illustrated in FIG. 3, and commences with steps 30 and 32 which sequentially provide the depth level samples of the five windows log samples W(n) and the total detected gamma radiation log samples $\gamma(n)$, respectively. At step 34 a pointer n is set to the depth level of the bottom end of the borehole depth interval of interest, so as to start the process with the appropriate sample of the W(n) log, and at step 36 the depth index is set to the same level to extract the appropriate sample of the $\gamma(n)$ log. At step 38 the process finds the current value of the factor C(n), in accordance with the procedure discussed in connection with expression (14) above, using as an input the sample of the $\gamma(n)$ log pointed to by the current value of n and using, in this case, a value of one for the factor C(n−1). The factor C(n) output from step 38 is stored in step 40 as the factor C(n−1) to be supplied back to step 38 for use in producing the next factor C(n). It is also supplied to step 42, where the weighting scalar k(n) is generated in accordance with the process discussed in connection with expression (15) above. The output of step 42 is supplied to step 44, which also receives the sample of the W(n) log pointed to by the current pointer n, and produces a filtered estimate of the Th,U,K concentrations for the depth level n in accordance with the process discussed in connection with expression (16) above. For this first run through step 44, the process uses for X(n−1) an estimate for the Th,U,K concentrations for the depth level n(min) which is derived by applying the matrix M to the windows log sample for the depth level n(min). The output of step 44 is the filtered estimate for the Th,U,K concentrations for depth level n, and it is stored in step 46 for use in the next run through step 44. The output of step 44 also is stored, recorded and/or plotted in step 48, which can also receive and store, record and/or plot the estimates of the total detected gamma radiation $\gamma(n)$, which can be simply the sum of the five windows of the W(n) log, and the weighting scalar k(n). A test is made at step 50 to determine if the current depth level n is within the borehole depth interval of interest and, if that is the case, the index n is incremented at step 52, and the process returns to steps 44 and 38. Of course, this time in step 38 the factor C(n−1) provided by step 40 to step 38 is the previous output of step 38 and, similarly, the previous filtered estimate X(n−1) which step 46 supplies to step 44 this time is the previous filtered estimate provided to step 46 by step 44. When step 50 indicates that the top of the borehole depth interval of interest has been reached, the process ends.

In a nonlimiting example of the second, more exacting embodiment of the invention, the filtering is again accomplished through the process discussed in connection with expression (4) above, but the filter for a particular depth level is derived through the more complex process discussed in connection with expression (5) above. The filter is different depending on whether the current depth level of interest is found to be in a homogeneous or a transition zone in the borehole and the filtered X(n) estimates can be further filtered by fixed-lag smoothing.

Figure 4:
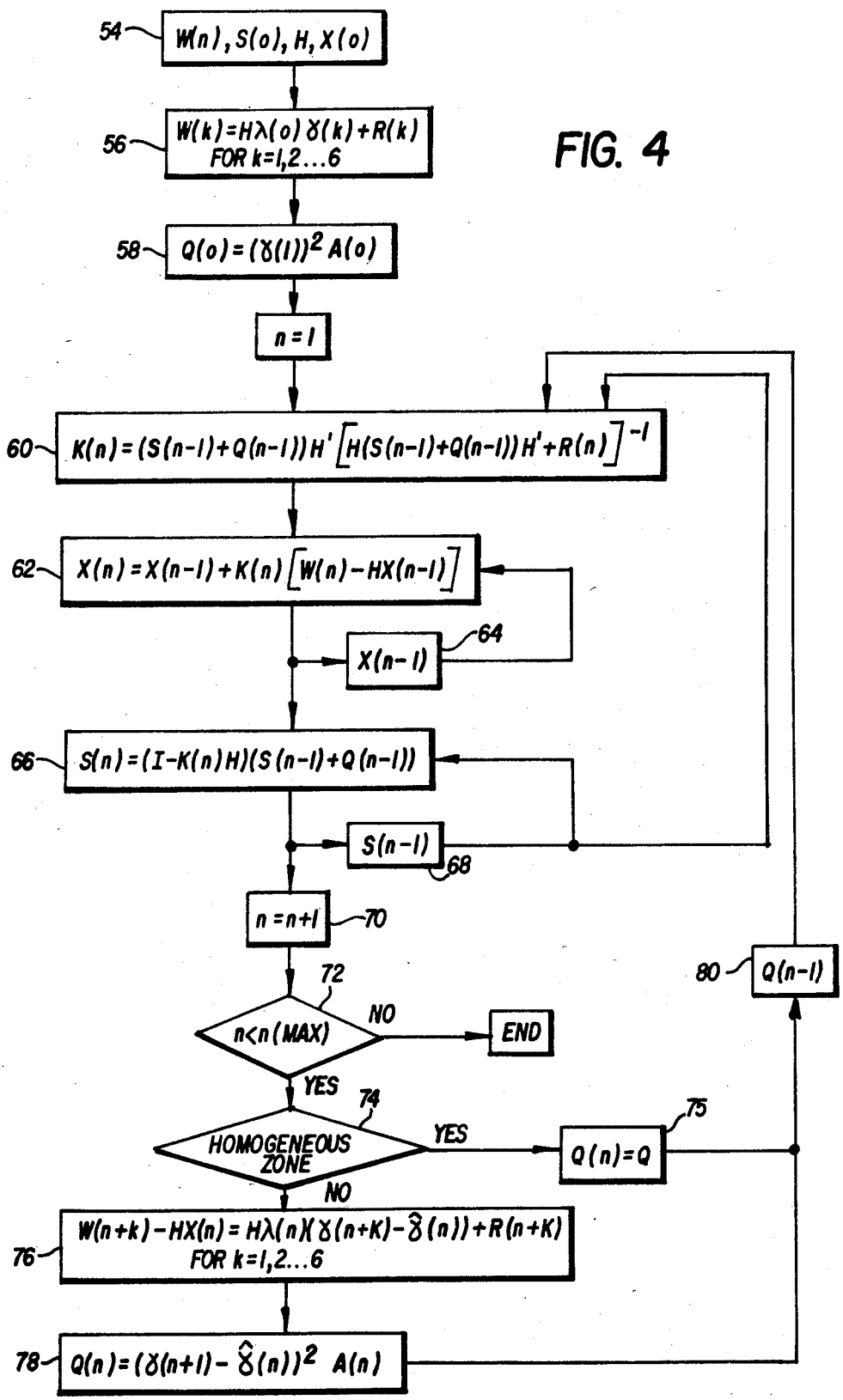
FIG. 4 is a flowchart illustrating a process in accordance with a second, more exacting embodiment of the invention.

An exemplary process in accordance with this second embodiment of the invention is illustrated in flowchart form in FIG. 4, and commences at step 54 which sequentially provides the five energy windows log W(n), starting with the sample for the lowermost depth level n=1 for the borehole interval of interest. Step 54 further provides a starting value S(0) for the 3×3 matrix S, a sensitivity matrix H and starting values for the estimate X(0) for the filtered Th,U,K concentrations at depth level zero. Said starting values can be as follows:

$$S(0) = \begin{pmatrix} 10^4 & 0 & 0 \\ 0 & 10^4 & 0 \\ 0 & 0 & 10^4 \end{pmatrix}$$

$$X(0) = \begin{pmatrix} 0 \\ 0 \\ 0 \end{pmatrix}$$

At step 56 a vector $\gamma(0)$ is evaluated by a least-square fit according to the relationship:

$$W(k) = H \lambda(0) \gamma(k) + R(k) \quad (17)$$
$$\text{for } k = 1, 2, \ldots, 6$$

where $\gamma(0)$ is a vector of the form:

$$\begin{bmatrix} \lambda 1 \\ \lambda 2 \\ \lambda 3 \end{bmatrix}$$

W(k) designates the five-windows log samples for depth levels one through six, $\gamma(k)$ designates the total detected gamma radiation for depth levels one through six and R(k) designates an estimate of statistical variations in W(k) for depth levels one through six and is defined, for a given depth level n, by:

$$R = \begin{bmatrix} (W1)/2 & 0 & 0 & 0 & 0 \\ 0 & (W2)/2 & 0 & 0 & 0 \\ 0 & 0 & (W3)/2 & 0 & 0 \\ 0 & 0 & 0 & (W4)/2 & 0 \\ 0 & 0 & 0 & 0 & (W5)/2 \end{bmatrix} \quad (18)$$

where W1, W2, etc. are the measurements in the respective energy windows for the relevant depth level. To avoid divergence of the filter, the diagonal elements are all bounded below by some positive constant (e.g. 1).

At step 58 in FIG. 4, the estimate Q(0) of the variances of the relevant geological noises found is a function of the total detected gamma radiation $\gamma(1)$ for depth level one and the vector elements of the $\gamma(0)$ found at step 56, in accordance with the relationship:

$$Q(0) = [\gamma(1)]^2 \begin{pmatrix} \lambda 1^2 & 0 & 0 \\ 0 & \lambda 2^2 & 0 \\ 0 & 0 & \lambda 3^2 \end{pmatrix} = [\gamma(1)]^2 A(0) \quad (19)$$

where the elements $\lambda 1$, $\lambda 2$ and $\lambda 3$ of the vector $\lambda(0)$ are for the 3×3 matrix A(0). At step, 60 the adaptive filter K(n) is found for the current depth level of interest as a function of the matrices S and Q for the previous depth level, the matrix R for the current depth level and the logging tool sensitivity matrix H and its transpose H', in accordance with the relationship discussed in connection with expression (5) above. For the first run through step 60, when n=1, the matrix S is the starting value provided from step 54, the matrix Q is provided by step 58 and the matrix R is derived as discussed in connection with expression (18) from the windows log sample for depth level one. At step 64 a filtered estimate X(n) is derived for the Th,U,K concentrations at the current depth level n as a function of the filtered estimate X(n−1) at the previous depth level, the adaptive filter gain K(n) found at step 60 for the same level n, the windows log sample W(n) for the same depth level, and the logging tool sensitivity matrix H, through a process of the type discussed in connection with expression (4) above. For the first run through step 62, when n−1, the filtered estimate for X(0) drops out and X(n) is a function only of K(n) and W(n). The X(n) estimate from step 62 is stored at 64, for use as the X(n−1) filtered estimate in the next run through step 62. At step 66 an estimate is derived of the matrix S(n) as a function of the identity matrix I, the filter gain K(n) found at step 60, the logging tool sensitivity matrix H and the estimates for the matrices S and Q found for the previous depth level n−1, the relationship therebetween being:

$$S(n) = [I - K(n)H][S(n-1) + Q(n-1)] \quad (20)$$

For the first run through step 66, where n=1, the estimate for the matrix S for the previous depth level is provided from step 54 and the estimate for the matrix Q for the previous depth level is provided from step 58. At step 68 the output of step 66 is stored as the estimate S(n−1) for use in the next run through steps 60 and 66, and the process is now initialized to run sequentially through the remainder of the depth levels in the borehole depth interval of interest. The depth level index n is therefore incremented at step 70 and, if a test at step 72 determines that the new depth level is still within the borehole depth interval of interest, and step 74 determines that the investigated lithology zone is not homogeneous, step 76 finds the vector λ(n) by evaluating the following relationship (21) for the vector λ(n) by a least-square fit method at the current value of the depth level index n and each of the values one through six for the index k:

$$W(n+k) - HX(n) = H\lambda(n)[\gamma(n+k) - \hat{\gamma}(n)] + R(n+k) \quad (21)$$
$$\text{for } k = 1, 2, \ldots, 6$$

where $\hat{\gamma}(n)$ is the sum of the components of W(n)=HX(n). At step 78, the matrix Q(n) is found for the current depth level n as a function of the elements of the vector $\hat{\gamma}(n)$ found at step 76 and the difference between the total detected gamma radiation at depth levels n and n+1 in accordance with the relationship:

$$Q(n) = [\gamma(n+1) - \gamma(n)]^2 \begin{bmatrix} \lambda 1^2 & 0 & 0 \\ 0 & \lambda 2^2 & 0 \\ 0 & 0 & \lambda 3^2 \end{bmatrix} = \quad (22)$$
$$(\hat{\gamma}(n+1) - \gamma(n))^2 A(n)$$

where λ1, λ2 and λ3 are the components of λ(n), and the output of step 78 is stored at step 80 as the matrix Q(n−1) to be used in the next evaluation in step 60. Of course, those skilled in the art will appreciate that in order to avoid filter divergence the diagonal elements of Q(n) must all be bounded below by some positive constant. The process then starts again at step 60 and cycles until the test at step 72 determines that the top end of the borehole depth interval of interest has been reached, at which time the process can end. If, during a cycle, it is determined at step 74 that the zone of interest is homogeneous, steps 76, 78 and 80 are bypassed, and step 75 sets the matrix Q(n) for the next level equal to a given small predetermined matrix Q used to track slow (Th,U,K) variations. Matrix Q is then stored at step 80 as the matrix Q(n−1) to be used in the next evaluation in step 60.

In accordance with the invention, the materials log samples X(n) can be further improved by fixed lag smoothing in which the estimate X(n) for the concentrations of Th,U,K at a given level n in the borehole becomes a further filtered sample X(n/n+N) which is determined by the sample X(n) and the samples X(n) for the next several feet of the borehole, e.g., for the next ten feet when samples are taken every six inches and N is 20. The relationship between a further filtered sample X(n/n+N) and the factors which determine it can be represented as:

$$X(n/n+N) = \quad (23)$$
$$X(n) + [S(n-1) + Q(n-1)] \left( \sum_{k=1}^{N} \prod_{j=0}^{k-1} [I - K(n+j)H]' E(n+k) \right)$$

where N equals 20 has been found to produce satisfactory results in practicing one example of this aspect of the invention and where the quantity E(n+k) is evaluated for each required depth level n in accordance with:

$$E(n) = H'[HS(n)H' + R(n)]^{-1}[W(n) - HX(n-1)] \quad (24)$$

In the further filtering process described in connection with expressions (23) and (24) above, the filtered sample X(n) is produced through a process such as a step 62 in FIG. 4, the matrix S(n) is produced as in step 66 in FIG. 4, I is the identity matrix, K(n+j) is produced for a given depth level n in accordance with a process as in step 60 in FIG. 4, H is the logging tool sensitivity matrix and H' is its transpose, W(n) are the energy windows measurements for the depth level n, e.g. from step 54 in FIG. 4, R(n) is the noise estimate produced by a process as discussed in connection with expression (18) above and X(n−1) is the filtered Th,U,K estimate for the depth level previous to depth level n.

As described above, the process connected with FIG. 4 can be simplified where the estimate X(n) being evaluated is for a depth level which happens to be in homogeneous portion of the borehole, in which the concentrations Th,U,K are stable or do not change rapidly. In a homogeneous zone, it can be expected that the geological noise Q(n) estimated in steps 76 and 78 in FIG. 4 is very low. Indeed, it has been found that the invented process produces satisfactory result when Q(n) is set to Q in homogeneous portions of the borehole. Therefore, in accordance with another aspect of the invention, a test is made first to determine if the depth level of interest is likely to be in a homogeneous zone or in a transient zone, and subsequent processing as described in FIG. 4 uses Q(n)=Q for all levels within a homogeneous zone and otherwise drives Q(n) as discussed in connection with steps 74 and 76. A test to determine whether a depth level is in a homogeneous or in a transient zone, which has been found to produce satisfactory results in practicing this invention, is to check the manner in which the total detected gamma radiation γ changes in the vicinity of the depth level n of interest. For example, a depth level n can be considered to be in a homogeneous zone if either of the following inequalities (26) is satisfied, where T1 is a threshold, e.g. 13, and T2 is another threshold, e.g. 4:

$$\sum_{k=0}^{5} [\gamma(n+k) - \gamma(n-1)]^2 / [\hat{\gamma}(n-1)] < T1 \quad (25)$$
$$[\gamma(n) - \hat{\gamma}(n-1)]^2 / \hat{\gamma}(n-1) < T2$$

where $\hat{\gamma}(n-1)$ is the reconstruction of the gamma ray at level (n−1) given by the filter.

Figure 5:
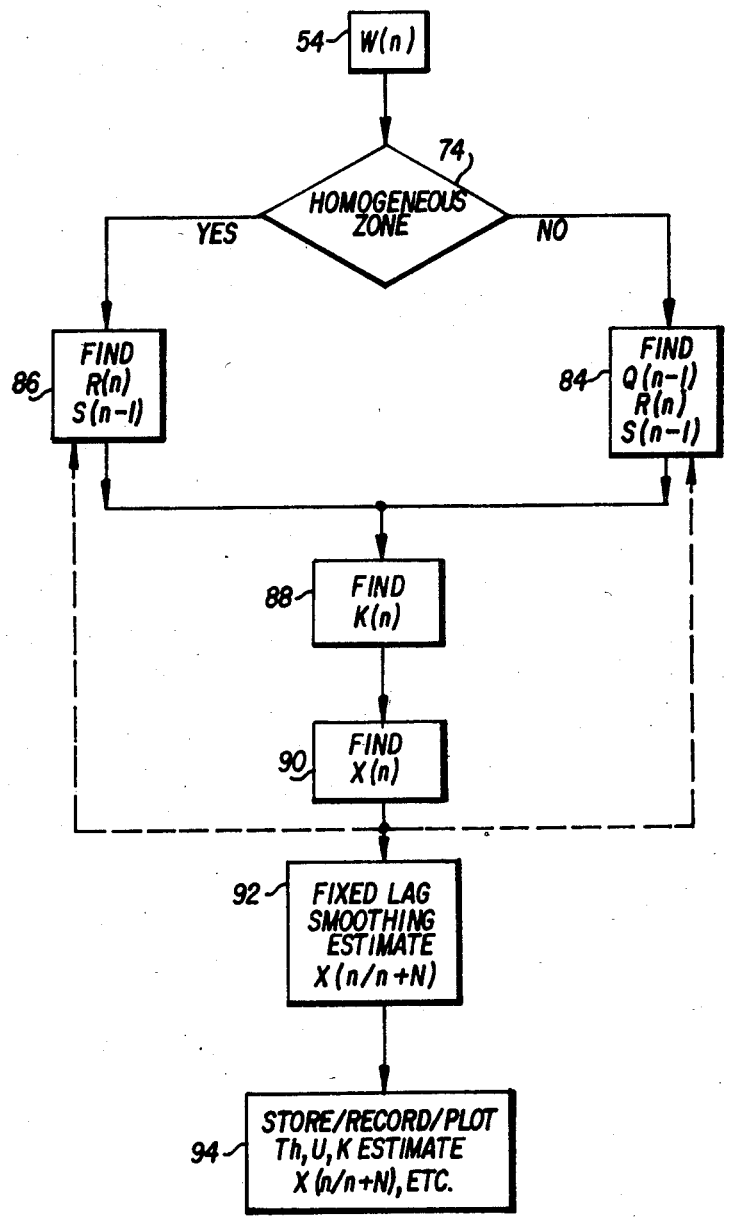
FIG. 5 is a flowchart relating to the second embodiment of the invention.

The overall process using the second, more exacting embodiment of the invention, is illustrated in FIG. 5, and commences with step 54 which provides sequentially the energy windows log samples W(n). Step 74 determines whether the current depth level n is in a homogeneous zone, by a test such as discussed in connection with expression (25) above. If the current depth level is not in a homogeneous zone, but in a transient one, step 84 finds the matrices Q(n−1), R(n) and S(n−1) in the manner discussed in connection with FIG. 4. If the current depth level is in a homogeneous zone, step 86 finds the matrices R(n) and S(n) as discussed in connection with FIG. 4, but assuming that the geological noise matrix Q(n−1) is zero. The results of steps 84 and 86 are supplied to step 88, where the adaptive filter gain K(n) for the current depth level is found in the manner discussed in FIG. 4. At step 90 the filter is applied as discussed in connection with FIG. 4 to produce the filtered estimate X(n) for the current depth level, which is supplied to steps 84 and 86 to be used therein to find the next set of matrices. Fixed-lag smoothing estimates are produced in step 92, in a process as discussed in connection with expressions (23) and (24). At step 94, the process results are stored, recorded and/or plotted, e.g. by producing a tangible representation of the Th,U,K concentrations on the basis of the further filtered estimates X(n/n+N) and/or other process results such as the estimates log X(n), etc.

Figure 6:
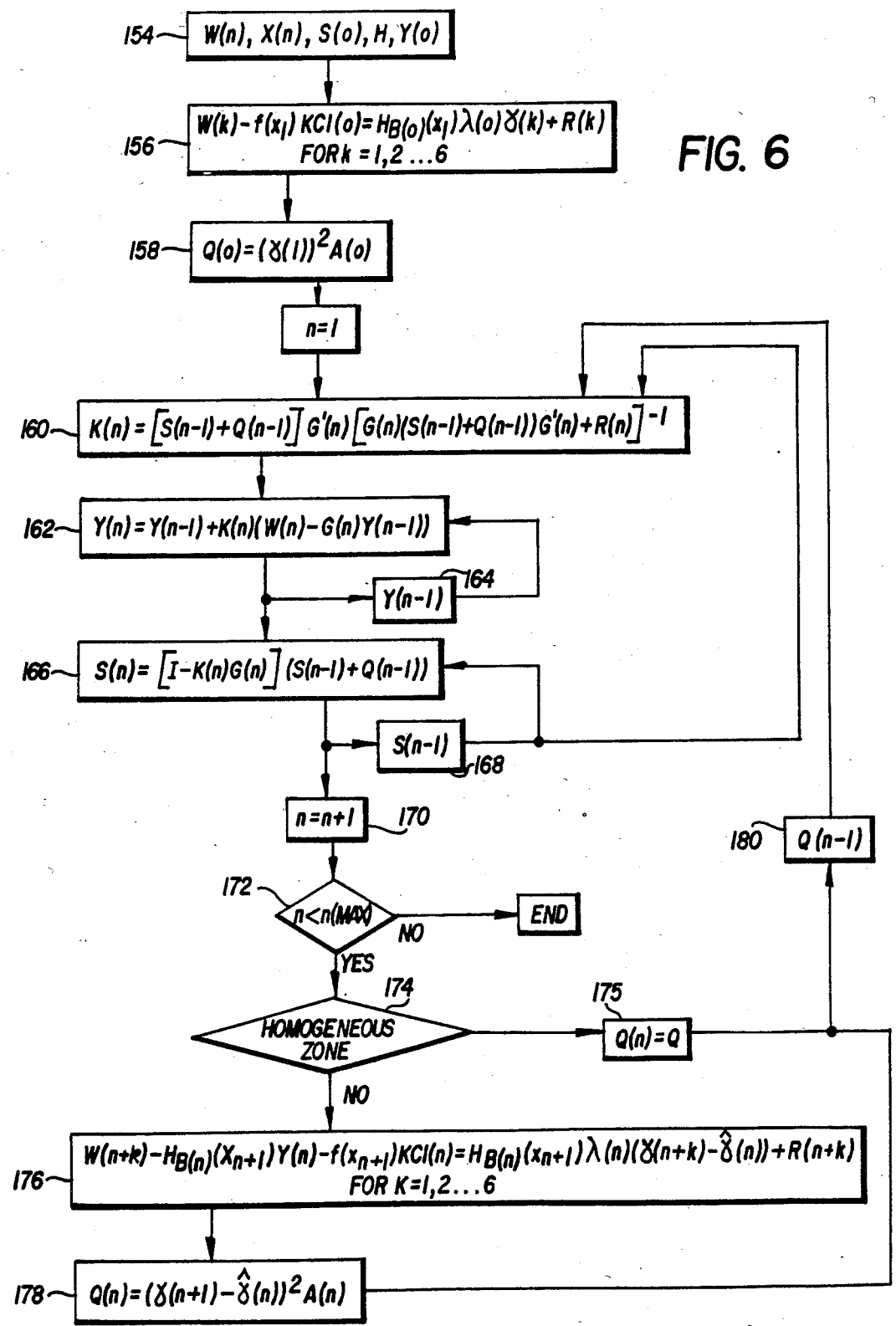
FIG. 6 is a flowchart illustrating a process in accordance with a third embodiment of the invention which accounts for environmental effects of the borehole size and borehold fluid.

From the nonlimiting example of the third embodiment which is represented by the flowchart of FIG. 6, those skilled in the art will recognize that the "environmental corrections" third embodiment of the invention is similar to the second exemplary embodiment. The important difference between the embodiments is that the third embodiment corrects the Th, U and K logs by accounting for the environmental effects of gamma ray emitters and absorbers in the borehole fluid, and the size of the borehole. Thus, instead of estimating a vector of dimension 3 (Th,U,K), a vector of at least dimension 5 (e.g. Th,U,K,KCl,B) must be estimated if at least one gamma ray emitter (in this case chosen as KCl) and at least one gamma ray absorber (in this case chosen as barite (B)) are found in the borehole fluid. Additionally, the tool response (expression (9)), becomes a non-linear function of the unknowns. However, using the extended Kalman filtering principle, the estimation equation will be formally the same as for a standard linear Kalman filter such as that of the second embodiment. The only change is that the constant 5×3 matrix H must be replaced by a depth varying 5×5 matrix G(n). G(n) is defined as the matrix of partial derivatives of $H_B(x)X + f(x)KCl$ with respect to Th,U,K,KCl and B evaluated at the preceding level by the filter as seen in expression (11), which accounts for the additional gamma ray emitter KCl in the mud as well as the gamma ray absorber.

Beyond supplying an estimated vector, (Y(n)) of dimension 5, and a depth varying sensitivity matrix (G(n)), the filter must be provided with a proper response equation model of the logging tool. Thus, as explained with reference to expressions 7 and 11, the borehole absorption coefficient x(n) which appears in G(n), is provided to account for the size of the borehole, while b, which also appears in G(n) accounts for the borehole fluid gamma ray absorber in the mud.

An exemplary process in accordance with this third embodiment of the invention is illustrated in flow-chart form in FIG. 6. The process commences at step 154 which provides the same starting information as step 54 of the second embodiment of FIG. 4 except that vector Y(0) of dimension 5 replaces X(0), S(0) is a 5×5 symmetric matrix which represents the knowledge about the first Th,U,K,KCl and B values prior to any measurements, and x(n) which is the borehole absorption coefficient is provided. Additionally, A(n), the 3×3 matrix defined in expression (22) is now the following 5×5 matrix:

$$\begin{pmatrix} \lambda_1^2 & 0 & 0 & 0 & 0 \\ 0 & \lambda_2^2 & 0 & 0 & 0 \\ 0 & 0 & \lambda_3^2 & 0 & 0 \\ 0 & 0 & 0 & 0 & 0 \\ 0 & 0 & 0 & 0 & 0 \end{pmatrix} \quad (13)$$

At step 156 the vector $\lambda(0)$ is evaluated by a least squares fit according to a more complex relationship than that of step 56 of the second embodiment. Accordingly, the vector is a function the environmental effects which are introduced into the relationship by the f(x), KCl and $H_B(0)$ terms, and other terms which were discussed in conjunction with step 154 and the second embodiment.

Steps 158, 160, 162, et seq. parallel the steps of the second exemplary embodiment except that the 5×3 tool sensitivity matrix H and its transpose H' are replaced by a depth varying 5×5 matrix G(n) and its transpose G'(n). Likewise, the application of the smoothing steps of FIG. 5 can be applied to the third exemplary embodiment, except that instead of finding the filtered estimate X(n) in step 90, the filtered estimate Y(n) of the five logs is found. Similarly in the fixed lag smoothing estimate step 92 and store/record/plot, Th,U,K estimate step 94, Y(n/n+N) is used so that the five variables (Th,U,K,B and KCl) will be smoothed and stored, recorded and plotted.

Those skilled in the art will appreciate that the third exemplary embodiment described above can be modified to account for different gamma ray emitters or absorbers in the borehole fluid. For example, if thorium is used in the borehole fluid, relationship (8) would be changed such that $$\begin{bmatrix} f_1(x) \\ f_2(x) \\ f_3(x) \\ f_4(x) \\ f_5(x) \end{bmatrix} Th_{fluid}$$

would replace the potassium term. As a result, G(n) as seen in expression (11) would be changed. If thorium were used in addition to the potassium chloride in the borehole fluid, and if barite was also in the fluid, the provided method and system would suffice, except that G(n) would become a 5×6 matrix due to the six unknowns. Similarly, if one gamma ray emitter was in the borehole fluid, but the gamma ray absorber effected two of the energy windows instead of one, the six unknowns would require a 5×6 matrix. Clearly, the provided method and system can account for other combinations of gamma ray emitters and/or absorbers in the borehole fluid and the inventor is not limited to those particularly cited.

Figure 7B:
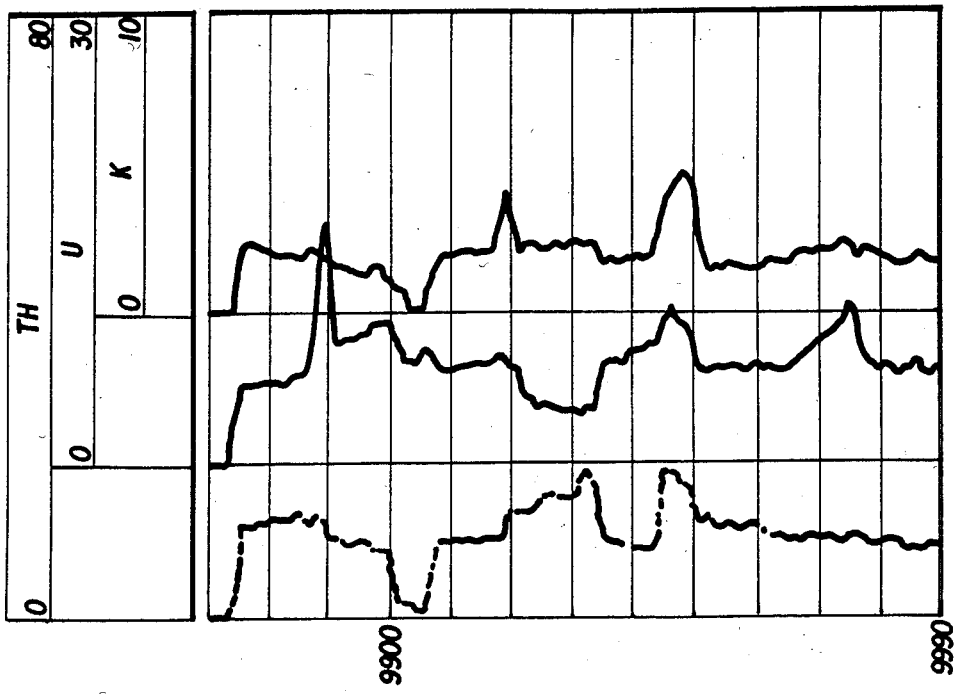
FIG. 7b illustrates a filtered Th,U,K log produced by a process in accordance with the first exemplary embodiment of the invention from an energy windows log produced by applying a tool sensitivity matrix to the Th,U,K distribution of FIG. 7a and adding noise.
Figure 7A:
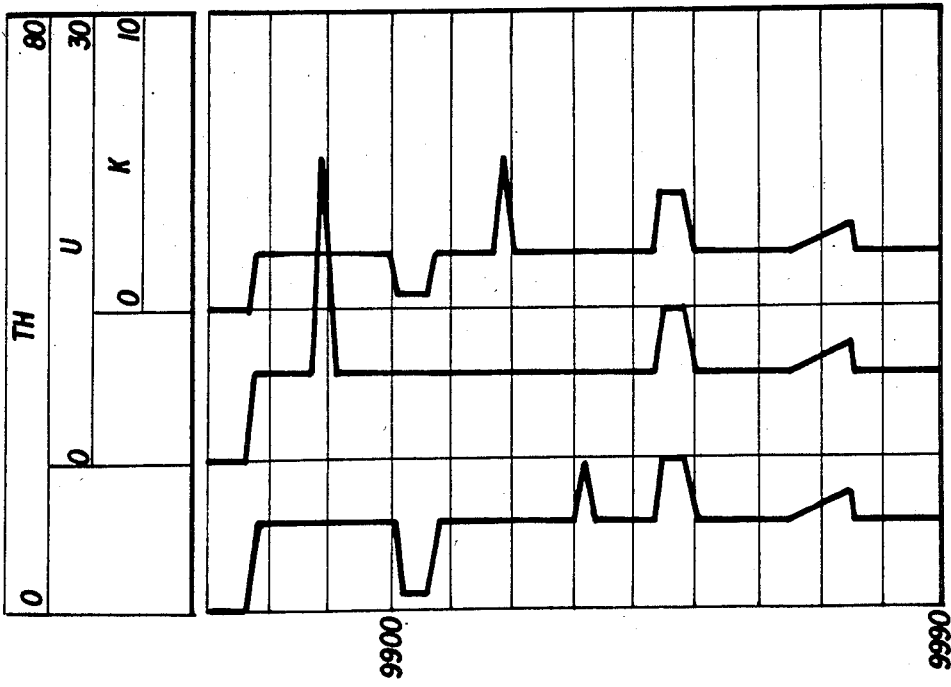
FIG. 7a illustrates an assumed subsurface distribution of Th,U,K.

For test purposes, the above-discussed first and second exemplary embodiments of the invention were applied both to energy windows logs derived from assumed subsurface distributions of thorium, uranium and potassium and to energy windows logs derived in actual boreholes. As an example, FIG. 7a illustrates an assumed subsurface distribution of Th,U,K where the vertical dimension is depth in the borehole in feet and the horizontal scales of Th and U are in parts per million while that of K is in percent. An energy windows log was derived from the Th,U,K distributions of FIG. 7a by applying thereto a logging tool sensitivity matrix H in accordance with the relationship W=HX and adding noise to simulate actual logging conditions. The Th,U,K log of FIG. 7b is that end result of applying the first exemplary embodiment of the invention to said simulated energy windows log, and the Th,U,K log of FIG. 7c is the result of applying the second exemplary embodiment to the same simulated energy windows log. For comparison with known prior art, FIG. 7d illustrates a Th,U,K log derived from the same simulated energy windows log in accordance with the prior art relationship X=MW and using a prior art four-second RC filter.

Figure 8B:
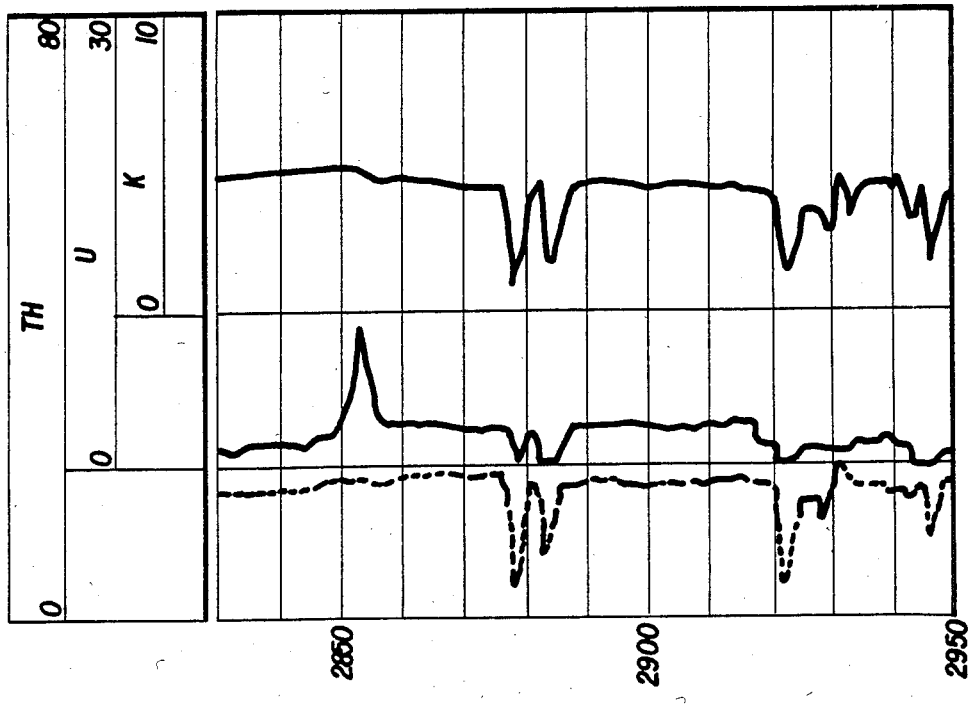
FIGS. 8a and 8b illustrate filtered Th,U,K logs produced in accordance with said first and second exemplary embodiments, respectively, from the same energy windows logs derived in an actual borehole.
Figure 8A:
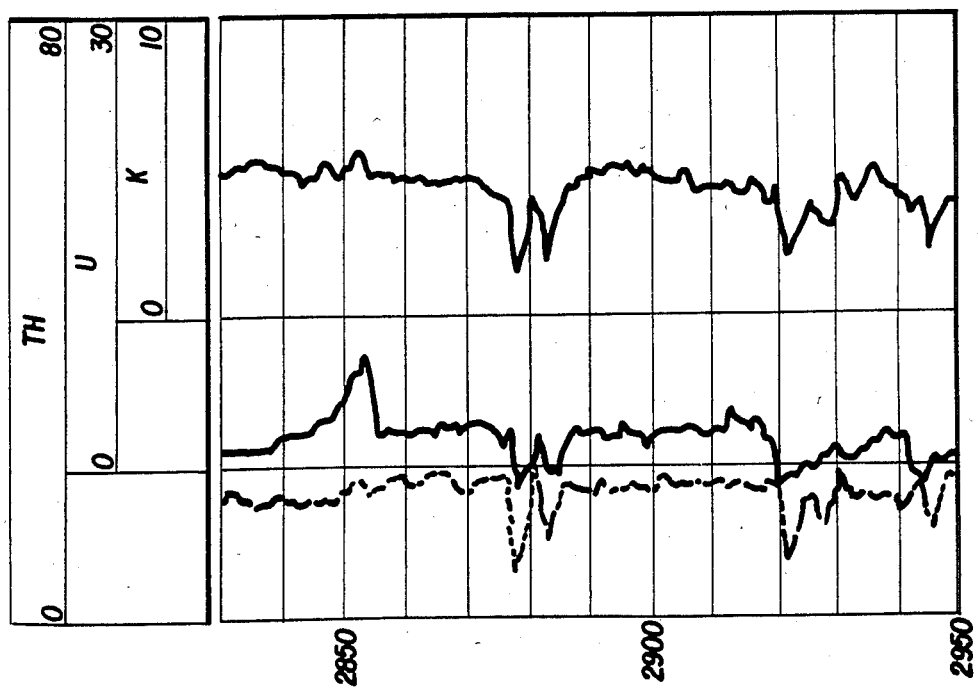
Figure 9A:
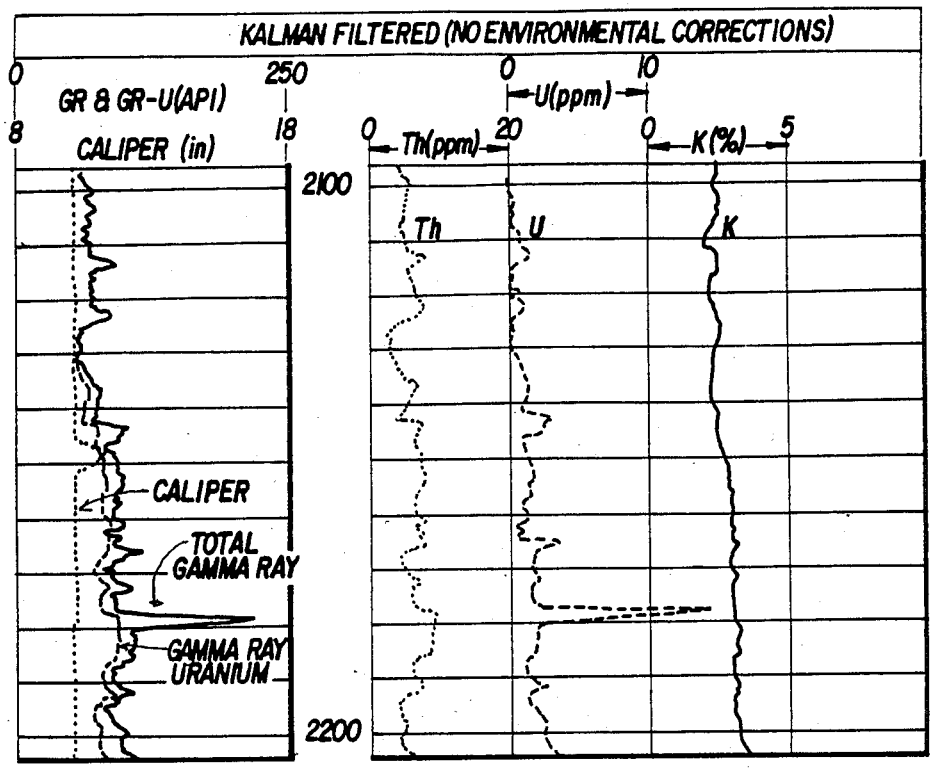
FIGS. 9a and 9b respectively illustrate filtered Th,U,K logs produced in accordance with the second exemplary embodiment, and produced in accordance with the third (environmental correction) embodiment which also includes additional borehole B and KCl logs; wherein both sets of logs are derived from the same energy windows logs gained in an actual borehole.
Figure 9B:
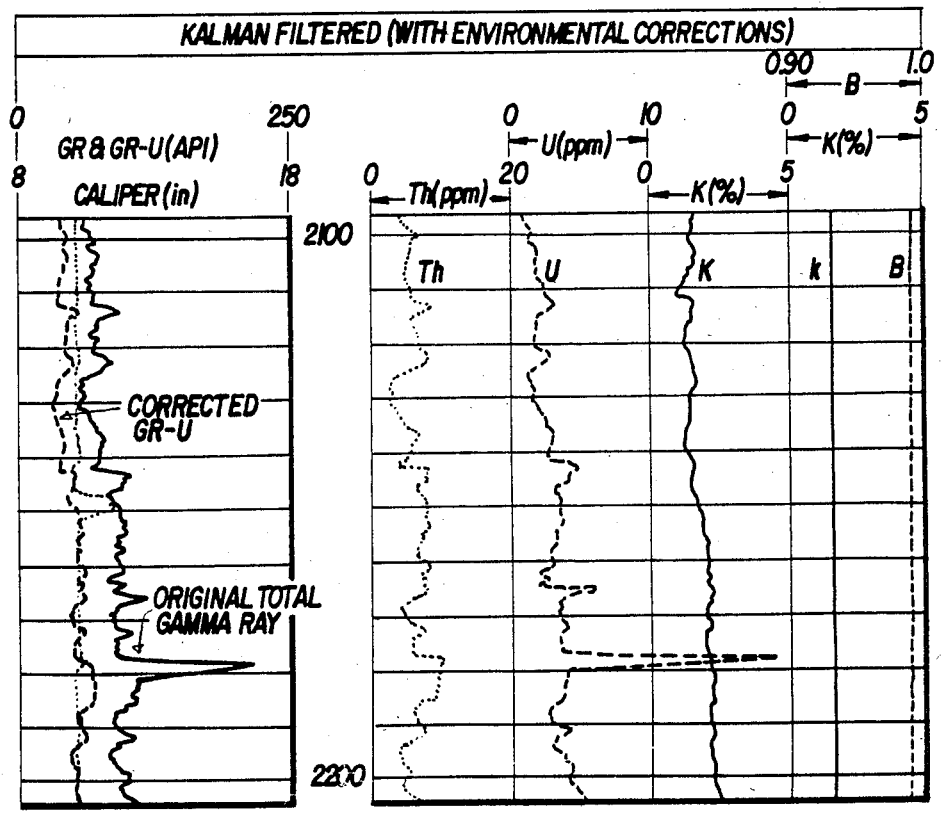

When the exemplary embodiments of the invention were applied to an energy windows log derived in an actual borehole, results such as those illustrated in FIGS. 8a, 8b, 9a and 9b are produced. The Th,U,K log in FIG. 8a is the result of using the first exemplary embodiment of the invention discussed above and that of FIG. 8b is the result of using the second exemplary embodiment. The Th,U,K log in FIG. 9a is also the result of using the second exemplary embodiment of the invention while the Th,U,K,B,KCl(k), log of FIG. 9b is the result of the third exemplary embodiment which makes environmental corrections.

In comparing the logs produced in FIGS. 9a and 9b, a marked improvement in the true values of formation Th,U,K can be observed. It is seen that the effect of the borehole KCl and B, and the borehole size effect had acted to suppress the readings of formation uranium. Likewise, in comparing the K readings, the environmental corrected filter is seen to have reduced the formation K reading and provided an additional log of KCl in the mud. Finally, close comparison of the Th logs reveals that the Th readings which are environmentally corrected are slightly higher than the second embodiment readings of FIG. 9a. This is due to the borehole size which is greater than 8" as seen by the caliper log.

The process illustrated in FIG. 3 as well as those illustrated in FIGS. 4, 5 and 6 can be computer-implemented by arranging and programming a general purpose digital computer of a suitable size and configuration, such as a commercially available machine under the designation VAX11, to carry out the steps discussed above. In the alternative, the illustrated processes can be implemented by means of a special purpose hard-wired and/or firm-wired machine carrying out the discussed steps. The processes of FIGS. 3, 4, 5 and 6 can be carried out substantially in real time. It is clear that the process of FIG. 3 is simpler and requires less processing time and equipment than that of FIGS. 4, 5 and 6. On the other hand, it is believed that the process of FIGS. 4 and 5 produces superior results while the process of FIG. 6 in conjunction with FIG. 5 superior is yet. Accordingly, all are preferred embodiments of the invention, and which one is chosen for a particular implementation depends on whether minimizing processing speed and equipment needs is preferable to optimizing perceived quality of results in a given set of circumstances.

The estimates of the vector $\lambda(n)$ produced in step 76 of the second exemplary embodiment and step 176 of the third exemplary embodiment which are measures of the geological noise which influence the end result of the invented process, can integrate important geological knowledge about the variation in the real concentrations of Th,U,K with borehole depth. For example, the vector $\lambda(n)$ for a particular borehole depth level should always be such that each of the Th,U,K estimates remain positive. An additional item of geological knowledge for use in the invented process is that the Th,U,K logs are usually not anti-correlated. Yet additional items of geological information (which are less important) are the requirements that the relative contributions of Th,U,K in the production of total detected gamma radiation are continuous functions of borehole depth, that the sequence of ratios Th/K usually presents a continuity pattern, and that the two additional ratios Th/U and U/K can present continuity patterns, e.g. in the case of the same shale interrupted by non-radioactive sandstone beds (or in the case of washouts). As another improvement, the tool sensitivity matrix H discussed in connection with the process of FIGS. 4 and 5 need not be the same for each depth level but can vary to account for geological knowledge of the borehole and the formations surrounding it at a given depth level so as to bring the Th,U,K estimates produced by the invented process yet closer to the probable true distributions of Th,U,K in the subsurface formations. This depth-varying option is incorporated in part in the third exemplary embodiment, as the tool response equation (9) takes into account the borehole size which may be depth-varying.

Attached hereto as Appendix A, to serve as a further explanation of these and other aspects of the invention, is a copy of the text at page 9, line 28 through page 31, line 18 of the European Patent Application No. EPO 81401249.8 filed July 31, 1981, on which this U.S. application and its parent application are based pursuant to the provisions of 35 USC 119.

Thus, in accordance with the invention, a log such as W(n) is derived of gamma radiation detected in selected energy windows by a logging tool, such as 10, passed through a selected borehole depth interval which extends through subsurface earth formations, and this energy windows log is converted into a log, such as X(n) or Y(n), of selected subsurface gamma radiation emitting materials such as Th,U,K, or both selected subsurface gamma radiation emitting materials and borehole gamma ray emitters and absorbers such as Th,U,K,B and KCl. The materials log is filtered by an adaptive filter, such as one discussed in connection with K(n), which is allowed to vary with borehole depth in accordance with selected changes with depth in detected gamma radiation and in a manner consistent with geological constraints. One nonlimiting example of such an adaptive filter was discussed in connection with FIG. 3 and varies with changes with depth in the total detected gamma radiation and in a manner consistent with geological constraints as reflected in the choice of the filter characteristics, e.g. the choice of the filter gain k(n) characteristics, including the parameters on which the component C(n) is based and the manner in which previous estimates of Th,U,K are used in determining the current one of interest. In other nonlimiting examples, the filter is allowed to vary as discussed in connection with FIGS. 4, 5 and 6 by taking into account an estimate, such as R(n), of the statistical variations in the windows log meaasurements, an estimate such a Q(n) of the geological noise and an estimate such as S(n) of the fluctuations in estimates of the materials log for previous borehole depth intervals. Additionally, the filter discussed in connection with FIG. 6 is provided with a model which accounts for the true borehole size, and for the gamma ray emitters and absorbers in the borehole fluid. Moreover, the latter examples of filtering are also consistent with geological constraints, as reflected in the manner in which the estimates of statistical variations in the windows log measurements, geological noise and previous Th,U,K or, Th,U,K,B and KCl estimates are derived and as reflected in the manner in which previous filtered estimates of the Th,U,K or Th,U,K,B and KCl logs are used. In the second and third embodiments of a filter, a further smoothing based on a fixed lag, e.g. as discussed in connection with expressions (23) and (24), can be used to further improve the materials log. A tangible representation of the filtered logs of the subsurface materials is produced, and nonlimiting examples thereof are discussed in connection with FIGS. 7a, 7b, 8a, 8b and 9a and 9b.

While the invention has been described above with respect to particular preferred embodiments, it will be recognized by those skilled in the art that the invention is not limited to those particular embodiments but includes any variation or other embodiment thereof which is within the scope of the appended claims.

APPENDIX A

One may safely assume that the model of the formation is a bottom-to-top sequence of half-foot thick layers with uniform Th, U, K concentrations. Let $X_n$ be the 3-dimensional vector describing the Th, U, K concentrations at the $n^{th}$ depth in the borehole.

Let $\Delta t_n$ denote the time the tool takes to run the $n^{th}$ interval. If i designates one of the five windows, let $N_n$ denote the total number of counts detected in the $i^{th}$ window during $\Delta t_n$ time. The double-indexed sequence $N_n^i$ may therefore be characterized by a realization of independent Poisson variables. The count rate for the $n^{th}$ depth and the $i^{th}$ window is therefore given by:

$$Z_n^i = N_n^i / \Delta t_n. \tag{1}$$

where $Z_n$ denotes the actual number of counts generated in the $i_{th}$ window during $t_n$ time.

Let $N_n$ and $Z_n$ represent the 5-dimensional vectors whose components are $N_n^i$ and respectively $Z_n^i$. Thereinafter the sum of the five components of $Z_n$ will be denoted by $\gamma_n$ and referred to as the (total) gamma ray.

If E( ) designates the mathematical expectation, the sequences $X_n$ and $Z_n$ will be assumed to be related by:

$$E(Z_n) = HX_n, \tag{2}$$

where H, the sensitivity matrix, is of (5×3) dimension. It is important to notice that equation (2) can only be an engineering approximation for the two following reasons.

Firstly, the sensitivity matrix has been estimated for a standard logging condition which can be quite different from the real one. For this reason, equation (2) should be replaced by:

$$E(Z_n) = H_n X_n, \tag{3}$$

where $H_n$ is a depth-varying matrix.

Secondly, equation (2) is valid only for thick homogeneous formations because it neglects effects due to the length of the detector and the scattering of the gamma photons. Nevertheless that equation will be hereinafter used because the exact expression of the transfer function relating the sequence $X_n$ to the sequence $E(Z_n)$ is not presently known.

Equation (2) may be rewritten in the following form:

$$Z_n = HX_n + V_n, \tag{4}$$

where $V_n$ is a zero-mean independent whose covariance matrix $R_n$ satisfies:

$$R_n = E(V_n V_n') = \frac{1}{\Delta t_n} \text{diag}(HX_n). \tag{5}$$

It is important to notice that, when the counts $N_n$ are not too few, $V_n$ is approximately Gaussian from the application of the Central Limit theorem. In this case the measurement equation (4) has the usual form of a signal $Y_n = HX_n$ degraded by an additive zero-mean Gaussian white noise $V_n$.

As can be expected, the first attempts to relate the counts in the windows to the radioactive elements investigated the simplest possible estimates of $X_n$, namely the ones that are a function of $Z_n$ only. In the aforementioned U.S. Pat. No. 3,976,878, it was proposed to estimate $X_n$ by minimizing the sum of some square norm of the measurement errors $V_n$:

$$\sum_n \| Z_n - HX_n \|_1^2. \tag{6}$$

where the norm in the 5 dimensional space ($R^5$) was assumed to have the following form:

$$\| x \|_1^2 = \sum_{i=1}^{5} \frac{x_i^2}{\sigma_i^2} \tag{7}$$

for any $x' = (x_1, \ldots, x_5)$.

A measurement matrix M may also be defined as the pseudo-inverse of H corresponding to the chosen norm $\| \, \|_1$.

A conceptual framework to improve the estimates by means of "filtering" or "smoothing" techniques, requires the assumption of an a priori probability distribution for the entire sequence $X_n$. Then to estimate the actual sequence from the sequence $Z_n$. Unfortunately, no obvious model of the Th, U, K distribution is available. In accordance with the present invention to add to the criterion defined in equation (6) a penalty term improves the continuity of the estimate:

$$\sum_n (\| Z_n - HX_n \|_1^2 + \| X_{n+1} - X_n \|_2^2). \tag{8}$$

where $\| \, \|_2$ was an arbitrary norm in $R^3$. As is well known, the best causal estimate $X_n$ belongs to the family of constant Kalman filters of the following form:

$$\hat{X}_{n+1} = \hat{X}_n + K(Z_{n+1} - H\hat{X}_n), \tag{9}$$

where K, known as the Kalman filter gain, is some (3×5) dimensional matrix which can be computed from the expressions of the normal $\| \, \|_1$ and $\| \, \|_2$.

To overcome the problem of the conflicting requirements of high resolution and noise rejection, a generalization of equation (9) is employed by using the following family of estimates:

$$\hat{X}_{n+1} = \hat{X}_n + K_n(Z_{n+1} - H\hat{X}_n), \tag{10}$$

where the gain $K_n$ is "small" (to fight against noise) for a Th, U, K homogeneous zone and "large" (to keep an acceptable resolution) in other zones i.e., the transition zones.

Therefore it may be assumed that:

$K_n = K_h$ if n belongs to a homogeneous zone, and (11)

$K_n = K_t$ if n belongs to a transition zone, (12)

The gain $K_h$ may be computed to minimize a criterion like that of equation (8), whereas $K_t$ may be taken proportional to the measurement matrix M. Of course $K_h$ and $K_t$ are chosen such that $K_t$ is "much greater" than $K_h$. The detection of homogeneous zones relied an analysis of the total gamma ray level using the following decision rule:

n belongs to a homogeneous zone $$iff (\nabla \dot{\gamma}_n)^2 \leq 9 var(\nabla \dot{\gamma}_n), \quad (13)$$

where $\nabla \dot{\gamma}_n$ is a filtered derivative of the gamma ray:

$$\nabla \gamma_n = 2\gamma_{n+2} + \gamma_{n+1} - \gamma_n - 2\gamma_{n-1}, \quad (14)$$

where $var(\nabla \hat{\gamma}_n)$ is an estimate of the variance of $\nabla \hat{\gamma}_n$:
$$var(\nabla \hat{\gamma}_n) = 10/3 \Delta t_n (\gamma_{n+1} + \gamma_n + \gamma_{n-1}). \quad (15)$$

To justify the decision rule of equation (13) one may note that, under the assumption of homogeneity in the depth interval (n−1, n+2), the probability of the occurence of the inequality defined by that equation is greater than 0.99.

Apart from some minor modifications, this filter should provide edequate solution to the anti-correlation problem. However, the results are not fully satisfactory. The major shortcoming is the occasional poor repeatability of the resultant Th, U, K log in the vicinity of transition zones. The following explanation may be given: to keep an acceptable resolution the transition filter must have a large gain $K_t$ which can result in substantial errors; moreover, when the switch to the homogeneous filter with its small gain $K_h$ is undertaken an initial erroneous estimate causes too long a time for the filter to stabilize to the correct mean value.

To reduce the effect of these problems, a better knowledge of $K_n$ around transition zones is needed and this can only be achieved through an explicit modeling of the Th, U, K vertical distribution.

The well-known limitation of the applicability of the classical Kalman filtering theory to real world problems is that the dynamical model of the process to be estimated must be completely specified in advance. Unfortunately, such a model does not exist at present. Therefore, in accordance with the present invention an adaptive Kalman filter is proposed which is based on the identification of the simplest possible model which reasonably describes the Th, U, K vertical distribution and the determination of the unknown underlying parameters of the model from the observation process $Z_n$. The filter itself will involve an estimation of the process $X_n$ from the process $Z_n$, using a fixed-lag smoothing algorithm.

As will be discussed hereinafter in more detail, a good candidate among the simplest models to describe the Th, U, K vertical distribution is the following random walk model:

$$X_{n+1} = X_n + W_n, \quad (16)$$

where the sequence $W_n$ is a zero-mean Gaussian white noise, whose covariance matrix will be denoted by $Q_n$; by definition we have $$Q_n = E(W_n W'_n). \quad (17)$$

Equation (16) will be subsequently referred to as the "system" equation and is based according to the present invention on the following rationale. First, the homogeneous zones described hereinbefore correspond naturally to the levels n where $Q_n$ is "small". Note that Q will not be taken equal to the null matrix in homogeneous zones, not only to follow slow gradational changes in the Th, U, K concentrations, but also to avoid the possible divergence of the filtering process. Second, the assumed Gaussian law of $W_n$ only apparently contradicts the following obvious constraint:

$$X_n \geq 0 \text{ for all n.} \quad (18)$$

In fact this simplifying assumption will keep the linearity of the filtering process with no real loss of performance.

Let us recall that the measured process $Z_n$ satisfies the following equation (assuming the Gaussian approximation of the law of $Z_n$):

$$Z_n = H_n X_n + V_n, \quad (19)$$

where $V_n$ is a zero-mean Gaussian white noise whose covariance matrix $R_n$ is given by equation (5). Clearly the processes $V_n$ and $W_n$ can be assumed to be independent. In equation (19), note that $H_n$ has been chosen to be depth-varying to take into account possible environmental corrections relating to the borehole, such as borehole diameter.

Without loss of generality, the process $Z_n$ can be supposed to be observed for all depths n in the interval [0,M]. To completely determine the probability distribution of the entire sequence $X_n$ which satisfy equation (16) the apriori statistical knowledge of $X_o$ must be specified. As $X_o$ will be generally unknown, it will be conveniently assumed that it is a zeron-means Gaussian random variable independent of the noises $W_n$ and $V_n$ and with a very large covariance matrix, denoted by $\Sigma_o$.

For the sake of clarity, the system and measurement equations are rewritten with their underlying statistical hypotheses:

$$X_{n+1} = X_n + W_n \, (0 \leq n \leq M), \quad (20)$$
$$Z_n = H_n X_n + V_n \, (0 \leq n \leq M), \quad (21)$$

where the initial state $X_o$ and the noises $W_n$ and $V_n$ are supposed to be zero-mean independent Gaussian processes, whose covariance matrices are respectively:

$$\Sigma_o = E(X_o X'_o), \; Q_n = E(W_n W'_n), \; R_n = E(V_n V'_n). \quad (22)$$

As mentioned above, $\Sigma_o$, $Q_n$, and $R_n$ will be assumed to be known throughout this section. Thanks to the simplifications made so far, the system and measurement equations have the nice form of a Kalman filter model. We will denote by $\hat{X}_{n/p}$ the best estimate of $X_n$ given the observation of $Z_o, Z_1, \ldots, Z_p$. The covariance matrix of the error random variable $X_n - \hat{X}_{n/p}$ will be designated by $\Sigma_{n/p}$. If the minimum error criterions is chosen, $\hat{X}_{n/p}$ is the conditional expectation of Xn, given $(Z_o, Z_1, \ldots Z_p)$, denoted by:

$$\hat{X}_{n/p} = E(X_n/Z_o, Z_1, \ldots, Z_p). \qquad (23)$$

When the entire sequence $Z_n$ is used, the best estimate $\hat{X}_{n/M}$ is computationally very demanding. If N is large enough, there is no serious loss of performance to replace it by the fixed-lag smoothing estimate $\hat{X}_{n/n+N}$. In the following discussion it will be shown how $\hat{X}_{n/n+N}$ can be obtained from the standard Kalman filtering estimate $\hat{X}_{n/n}$.

The standard Kalman filter is then given by the following recursion:

a. Time-Update:

$$\hat{X}_{n/n-1} = \hat{X}_{n-1/n-1}, \qquad (24)$$

$$\Sigma_{n/n-1} = \Sigma_{n-1/n-1} + Q_{n-1}, \qquad (25)$$

b. Measurement-Update:

$$K_n = \Sigma_{n/n-1} H'_n (H_n \Sigma_{n/n-1} H'_n + R_n)^{-1}, \qquad (26)$$

$$\hat{X}_{n/n} = \hat{X}_{n/n-1} + K_n (Z_n - H_n \hat{X}_{n/n-1}), \qquad (27)$$

$$\Sigma_{n/n} = (I - K_n H_n) \Sigma_{n/n-1}. \qquad (28)$$

where I is a (3×3) identity matrix.

It is interesting to compare this filtering to the one presented in equation (6). Equations (27) and (10) are formally the same but the gain $K_n$ is now recomputed at each depth instead of switching between two present values. Moreover, the optimality of $K_n$ can be claimed whenever the system model is valid.

The fixed-lag smoothing estimate $\hat{X}_{n/n+N}$ is obtained using the following relationship:

$$\hat{X}_{n/n+N} = \hat{X}_{n/n} + \Sigma_{n/n-1} \left[ \sum_{k<1}^{N} (I - K_{n+k} H_{n+k})' E_{n+k} \right], \qquad (29)$$

where $E_n$ designates the 3-dimensional normalized innovation process:

$$\hat{E}_n = H'_n (H_n \Sigma_{n/n-1} H'_n + R_n)^{-1} (Z_n - H_n \hat{X}_{n/n-1}). \qquad (30)$$

Remembering that $(H_n \Sigma_{n/n-1} H'_n + R_n)$ is a (5×5) dimensional matrix, it can be seen that the calculation of $H'_n (H_n \Sigma_{n/n+1} H'_n + R_n)^{-1}$ is the major factor in the determination of $\hat{X}_{n/n+N}$. It will be shown in the next paragraph how sequential processing, in accordance with principles of the present invention, can significantly reduce the computational requirements of the filtering.

The basic idea of sequential processing is to handle the measurement process one component at a time. If i designates some window index (i=1, 2, ..., 5), let us then introduce the following quantity:

$$\tilde{X}^i_{n/p} = E[X_n/(Z_o, Z_1, \ldots, Z_{p-1}), Z_p^1, \ldots, Z_p^i]. \qquad (31)$$

Let $\Sigma^i_{n/p}$ denote the covariance matrix of the error $X_n - X^i_{n/p}$. Clearly we have $\hat{X}^5_{n/p} = \hat{X}_{n/p}$; it is convenient also to set $\hat{X}^o_{n/p} \hat{X}_{n/p-1}$. In the same way we have $\Sigma^5_{n/p} = \Sigma_{n/p}$ and $\Sigma^o_{n/p} = \Sigma_{n/p-1}$. In the sequel $H_n$ and $R_n$ will designate the $i_{th}$ row of $H_n$ and respectively the $i^{th}$ diagonal element of $R_n$. In the sequential Kalman filter processing, the time-update equation remains the same but the measurement up-date equation now splits into five iterations (i=1, 2, ..., 5):

$$K_n^i = \Sigma_{n/n}^{i-1} (H_n^i)' [H_n^i \Sigma_{n/n}^{i-1} (H_n^i)' + R_n^i]^{-1}, \qquad (32)$$

$$\hat{X}_{n/n}^i = \hat{X}_{n/n}^{i-1} + K_n^i (Z_n^i - H_n^i \hat{X}_{n/n}^{i-1}), \qquad (33)$$

$$\Sigma_{n/n}^i = (I - K_n^i H_n^i) \Sigma_{n/n}^{i-1}. \qquad (34)$$

The recursion is initialized by $\Sigma^o_{n/n} = \Sigma_{n/n-1}$ and $\hat{X}^o_{n/n} = \hat{X}_{n/n-1}$ and terminated by $\Sigma^5_{n/n} = \Sigma_{n/n}$ and $\hat{X}^5_{n/n} = \hat{X}_{n/n}$. The advantage of sequential processing is that the quantity $$[H_n^i \Sigma_{n/n}^{i-1} (H_n^i)' + R_n^i]$$

is now a scalar. To obtain $X_{n/n+N}$ we use equation (29) as before. The feedback matrix $(I = K_n H_n)$ is computed via the identity:

$$I - K_n H_n = I - \Sigma_{n/n} H'_n R_n^{-1} H_n, \qquad (35)$$

while the normalized innovation $E_n$ is given by:

$$E_n = \sum_{i=1}^{5} \left( \prod_{j=1}^{i=1} (I - K_n^j H_n^j)' \right) (H_n^i)' (H_n^i \Sigma_{n/n-1} (H_n^i)' + R_n^i)^{-1} (Z_n^i - H_n^i \hat{X}_{n/n}^{i-1}) \qquad (36)$$

(with the convention that the product in brackets is the identity matrix when i=1).

Up till now it has been shown that, if the system and measurement equations (20) and (21) are valid and if $\Sigma_o$ and the two sequences $Q_n$ and $R_n$ are known, then the determination of the Th, U, K content is easily solved using a fixed-lag smoothing. Unfortunately, if the first assumption appears reasonable, the second one is quite unrealistic. This leads to the use of an adaptive Kalman filtering scheme, where $\Sigma_o$ and the sequences $Q_n$ and $R_n$ are to be estimated on-line from the available data $(Z_o, Z_1, \ldots, Z_M)$. This is relatively easy for $\Sigma_o$ and $R_n$. For $\Sigma_o$, any very large matrix would be appropriate. Although this can be further refined, the following unbiased estimate can be proposed for $R_n$:

$$\hat{R}_n = \frac{1}{\Delta t_n} \text{diag}(Z_n). \qquad (37)$$

In fact, it follows from equation (4) that $EZ_n = HX_n$; hence, $E\hat{R}_n = R_n$ results from the application of equation (5).

Therefore, the only remaining problem is to estimate sequence $Q_n$. Remembering that the random walk model is not an absolute truth, the more fundamental problem is to find the "best" modeling for the Th, U, K vertical distribution.

It has already been observed that one of the simplest model reflecting the content of a Th, U, K in homogeneous and transition zones is the random walk:

$$X_{n+1} = X_n + W_n,$$

with a respectively small and a respectively large variance for $W_n$ in corresponding homogeneous and transition zones.

Nevertheless, for a more complete analysis it was felt that the white noise assumption for $W_n$ is perhaps too simple and that it would surely be more realistic to model $W_n$ as a "colored" noise. Guided by the general idea that the process cannot be used to estimate highly varying quantities of Th, U, K accurately (because of the Cramer-Rao bound), the following model has been investigated:

$$X_{n+1} = X_n + A_n f(n), \qquad (38)$$

where $A_n$ is a slowly varying 3-dimensional random process, while f(n) is an arbitrary scalar function. Using the measurement equation (2) and assuming for simplicity that H is constant between depths n and n+1, we deduce from equation (38) that:

$$Z_{n+1} - Z_n = (H_n A_n) f(n) + (V_{n+1} - V_n). \qquad (39)$$

Summing the five components and taking the mathematical expectations of both members of equation (39), one obtains that:

$$E(_{N+1}\gamma_a + a - \gamma_n) = k_n f(n), \qquad (40)$$

where $k_n$ is a proportionality coefficient which, without loss of generality, can be assumed to be unity. When $(\gamma_{n+1} - \gamma_n)$ is large enough, as in transition zones. One may note that f(n) can be approximated by $(\gamma_{n+1} - \gamma_n)$ itself. This shows that, roughly speaking, the estimation of $A_n$ and f(n) is decoupled and that the five window spectral analysis is used to estimate the slowly varying process $A_n$ only.

Of course the nice model of equation (38) needs to be supported by some geological evidence. First, it will be appreciated that equation (38) is especially suited to model anomalies of one radioactive element in an otherwise homogeneous background. For example, a uranium anomaly (whose detection and estimation are among the important tasks of radioactive prospecting is well represented by the following equation:

$$T_{n+1} = T_n, \; U_{n+1} = U_n + a(\gamma_{n+1} - \gamma_n), \; K_{n+1} - K_n, \qquad (41)$$

where a is the sum of the elements of the second column of $H_n$. More generally, equation (38) means that no "feature" can exist on the Th, U, K curves if it is not a result of a contribution to the gamma radiation.

Apart from this phenomenological reason, a more fundamental geological justification can be proposed: the ratios Th/K, Th/U, and U/K have been related to some sedimentological processes and Th/K is believed to be indicative of types of clays. Using equation (38), it can be easily shown that, if the ratios are constant on a given depth interval, then the process $A_n$ is constant on the same interval. Thus, the assumption that $A_n$ is slowly varying is a consequence of the homogeneity of the ratios. Knowing that a real log contains different sedimentological patterns, as determined from other logs, e.g., electrical logs, the best that can be assumed is that the ratios are locally homogeneous with some abrupt changes. To account for that precept, one has to refine equation (38) as follows:

$$X_{n+1} = X_n + A_n f(n), \qquad (42)$$

$$A_{n+1} = A_n + \nu \delta_{nT} \qquad (43)$$

where T is the unknown time of an abrupt change and $\nu$ is the vector representing the jump in $A_n$ at time T. Of course, equation (43) models only one abrupt change, but it is just a matter of bookkeeping to modify equation (43) to take into account serveral jumps.

As it may appear desirable to allow some abrupt changes for $X_n$ too, the following general model for the Th, U, K vertical distribution is proposed:

$$X_{n+1} = X_n + A_n f(n) + W_n + \mu \delta_{nT}, \qquad (44)$$

$$A_{n+1} = A_n + U_n + \nu \delta_{nT}. \qquad (45)$$

where $\delta_{nT}$ is the Kronecker delta; $\delta_{nT} = 0$ if n=T and $\delta_{nT} = 1$ if n=T.

Here $U_n$ and $W_n$ are two zero mean independent Gaussian white noises with constant covariance matrices. These are chosen to be small to take into account unmodeled effects. The function f(n) can be taken to be equal to some filtered derivative of the gamma ray which best estimates $E(\gamma_{n+1} - \gamma_n)$. Finally, T denotes the unknown time of an abrupt change in $X_n$ and (or) $A_n$; $\mu$ and $\nu$ designate the jumps in $X_n$ and $A_n$ at time T.

To test the validity of the model of equations (44) and (45), one may first neglect the problem of the unknown changes. The standard Kalman filtering therory can still be applied to estimate both $X_n$ and $A_n$ from the measurement process $Z_n$. The reason is that the dynamical system is conditionally linear, i.e., f(n) is a known function subject to the observation of the process $Z_n$.

Since a goal of the present invention is the realization of a real-time filter and process, the "optimal" filtering techniques are presently too complicated because they would have to locate the aforementioned abrupt changes. Moreover, these techniques would have to estimate not only X but also A which is of lesser interest. With the presently available computing power it turns out that these techniques could only be implemented off-line. In the next paragraphs a detailed description is provided for a suboptimal filter which, in accordance with principles of the present invention, can provide an acceptable trade-off between complexity and performance.

Although it has no clear theoretical justification, the proposed filtering technique is an attempt to keep the simplicity of the random walk model while profiting from the Th, U, K model investigated in the preceding paragraph. More precisely, the technique will estimate $X_n$ using a fixed-lag smoothing based on the random walk model of equation (26). The unknown sequence $Q_n$ is to be determined by considering that model as an "approximation" of the model of equations (44) and (45).

Let us recall the equations of the model which will be assumed from now on:

$$X_{n+1} = X_n + W_n, \qquad (46)$$

$$Z_n = H_n X_n + V_n, \qquad (47)$$

where $W_n$ and $V_n$ are zero-mean independant Gaussian white noises. The fixed-lag smoothing based on this model has already been described. Throughout this paragraph, the covariance matrix $R_n$ of $V_n$ will be estimated by the diagonal matrix $R_n$ whose $i^{th}$ diagonal element is given by $$\dot{R}_n(i) = \max\left(.5, \frac{1}{\Delta t_n} Z_n^i\right). \quad (48)$$

This modification of equation (37) is simply to put a lower bound on R to avoid filter divergence. The covariance matrix $Q_n$ of $W_n$ will be assumed diagonal. The reasons for this are twofold: firstly, there exist no known prior correlations between the increments of Th, U, and K and secondly, the estimation of the non-diagonal part of $Q_n$ would be unreliable because of the ill conditioning of the sensitivity matrix $H_n$.

If one assumes that the sequence $Q_m$ has been estimated up till level $n-1$, then replacing the sequences $Q_m$ and $R_n$ by their estimates the Kalman filter defined by equations (24) to (28) can be implemented. This filter yields the estimate $\hat{X}_{m/m}$ for all $m \leq n$. Because of equation (46), it is easy to see that, for all $k \leq 1$, the optimal prediction $\hat{X}_{n+k/n}$ of $X_{n+k}$ from the window count rates up till depth n is simply $\hat{X}_{n/n}$. Consequently, the optimal predictions of the window count rates and the gamma ray at level $n+k$ are then respectively:

$$\dot{Z}_{n+k/n} = H_{n+k}\dot{X}_{n/n}, \quad (49)$$

$$\dot{\gamma}_{n+k/n} = \sum_{i=1}^{5} \dot{Z}_{n+k/n}^i. \quad (50)$$

As explained above, we will now assume that the equation of the following form, which is just a slight modification of equation (38), is valid for all k between 1 and p:

$$X_{n+k} = \hat{X}_{n+k/n} + A(\gamma_{n+k} - \dot{\gamma}_{n+k/n}), \quad (51)$$

where A is some unknown (but deterministic) 3-dimensional vector. Let us designate by Â the "best" estiamte (as defined below) of A from $\hat{X}_{n+k/n}$ and the window count rates $(Z_{n+1}, Z_{n+2}, \ldots, Z_{n+p})$. Viewing equation (46) as an approximation of equation (51), it is then "natural" to estimate the $i^{th}$ diagonal element of $Q^n$ by:

$$\dot{Q}_n(I) = (\dot{\gamma}_{n+1} - \dot{\gamma}_{n+1/n})^2 \hat{A}_i^2, \quad (52)$$

where $A_i$ designates the $i^{th}$ component of Â. The choice of p is important. On the one hand, p cannot be too small so as to have an acceptable effect on the accuracy of the determination of Â. On the other hand, p cannot be too large so as to adversely affect the validity of equation (51). Extensive testing on both simulated and real logs have shown that $p = 6$ appears to be a good trade-off and therefore this value wll be assumed.

Let us return now to the estimation of A. From equations (47), (49), and (51), it follows that:

$$\dot{Z}_{n+k} = Z_{n+k/n} + H_{n+k}A(\dot{\gamma}_{n+k} - \gamma_{n+k/n}) + V_{n+k}, \quad (52a)$$
$$(1 \leq k \leq 6).$$

Neglecting all the uncertainties in $Z_{n+k/n}$ and $\gamma_{n+k}$, with respect ot those in $V_{n+k}$ the minimum variance estimate Â of A is obtained by minimizing the following quadratic form of A:

$$\phi(A) = \sum_{k=1}^{6} V_{n+k} \dot{R}_{n+k}^{-1} V_{n+k}, \quad (53)$$

where $V_{n+k}$ is defined through equation (52). Straightforward computations show that $$\hat{A} = P^{-1}L, \quad (54)$$

where L and P under are the 3-dimensional vector and the ($3 \times 3$) symmetric positive definite matrix given respectively by $$L = \sum_{k=1}^{6} (\gamma_{n+k} - \dot{\gamma}_{n+k/n}) H'_{n+k} \dot{R}_{n+k}^{-1} (Z_{n+k} - \dot{Z}_{n+k/n}), \quad (55)$$

$$P = \sum_{k=1}^{6} (\gamma_{n+k} - \dot{\gamma}_{n+k/n})^2 H'_{n+k} \dot{R}_{n+k}^{-1} H_{n+k}. \quad (56)$$

Let us now make the two following comments on the procedure described above. Firstly, this procedure will make the filtering less sensitive to modeling errors than the optimal techniques based on the assumed correct model of equations (44) and (45). Secondly, the covariance matrix of Â is the inverse of P. This shows that the estimation of A will not be reliable in these zones where the detected gamma ray spectrum has too low a signal-to-noise ratio and the noise on the gamma ray spectrum can no longer be safely neglected.

This basic problem dictates, therefore, the need of allocating each detected gamma ray level to homogeneous or transition zones.

It is to be emphasized that the zoning of the detected gamma ray is not an aim in itself, but only an intermediate step in the filtering process. Therefore there is a need to decide, at any given depth n, whether the detected gamma ray level is constant or not in a given neighborhood of n. Hence, it is natural to say that n belongs to a homogeneous zone if:

$$H_0: E(\gamma_{n+k}) = a \quad (-m \leq k \leq m), \quad (57)$$

where a is an unknown constant, while m designates the size of the neighborhool of depth n.

To test $H_0$ one needs an alternative hypothesis; more precisely, one has to model how a transition zone will appear on the gamma ray level. Because of the various convolution effects influencing the tool response, a parabolic model seems to simplest candidate to represent thin beds or sharp transition. Hence, we will set:

$$H_1: E(\gamma_{n+k}) = b + ck + dk^2, \quad (-m \leq k \leq m), \quad (58)$$

where b, c, and d are unknown constants. Standard Th, U, K data show that the tool responds to a spherical volume of matter having diameter of approximately 3 ft. This justifies the choice $m = 3$, which will be assumed hereafter.

To test $H_0$ against $H_1$, we will maximize the probability to correctly detect $H_1$ while constraining the probability of false alarms (we therefore choose $H_1$ when $H_0$ is true) to be less than a given small threshold, say. This dissymmetry of the roles of $H_0$ and $H_1$ is natural in as much as the estimation of $Q_n$ above has been proven unreliable in cases of a low signal-to-noise ratio of the gamma ray level. The two hypotheses being composite (because of the unknown parameters a, b, c, d), the generalized likelihood ratio test is the usual procedure to test $H_0$ against $H_1$. Before describing the test, we need to introduce some notation.

Let $\gamma$ denote the vector $(\gamma_{n-3}, \gamma_{n-2}, \ldots, \gamma_{n+3})$. For $i = 0, 1$, let $\theta_i$ designate the set of all the unknown parameters in the law of $\gamma$ when $H_i$ is true. When $\hat{\theta}_i$ is given, the likehood (i.e., the probability distribution) of $\gamma$ will be denoted by L $(\gamma/\hat{\theta}_i)$. The maximum likelihood estimate $\hat{\theta}_i$ of $\theta_i$ is then defined by:

$$L(\gamma/\hat{\theta}_i) \geq L(\gamma/\dot{\theta}_i) \ (\gamma\theta_i,\ i = 0, 1). \quad (59)$$

In the following discussion the quantity above will be simply written L $(/H_i)$.

The generalized likelihood ratio test is then:

"n belongs to a transition zone":

$$\text{iff } L(\gamma/H_i) \geq \lambda L(\gamma/H_n), \quad (60)$$

where $\lambda$ is chosen such that the probability of a false alarm is less than $\alpha$. Because $(\Delta t_n \gamma_n)$ is a Poisson variable, the estimate $\theta_i$ is not easy to obtain. To save processing time, one computes $\theta_i$ as if $\gamma_{n+k}$ was Gaussian with a constant variance. In this case, $\theta_1 = (\hat{b}, \hat{c}, \hat{d})$ is obtained by minimizing:

$$\sum_{k=-3}^{+3} (\gamma_{n+k} - b - ck - dk^2)^2. \quad (61)$$

Straightforward calculations lead to the following estimates:

$$\dot{a} = \frac{1}{7} u, \quad (62)$$

$$\dot{b} = \frac{1}{21} (7u - w), \quad (63)$$

$$\dot{c} = \frac{1}{28} v, \quad (64)$$

$$\dot{d} = \frac{1}{84} (w - 4u), \quad (65)$$

where u, v and w are respectively ($\Sigma$ designates the sum from k=−3 to k=3):

$$u = \Sigma \gamma_{n+k}, \ v = \Sigma k \gamma_{n+k}, \ w = \Sigma k^2 \gamma_{n+k}. \quad (66)$$

With the same idea of saving processing time, it is also convenient to compute the likehoods $L(\gamma/H_i)$ by replacning the law of $\gamma_{n+k}(-3 \leq k \leq 3)$ by their Gaussian approximations whose variances will be both assumed equal to $\hat{a}/\Delta t_n$ (which is true for $H_o$ but is a rough approximation for $H_1$). In this case, taking the logarithms of equation (59), results in:

$$(w - 4u)^2 - 3v^2 \geq \mu u, \quad (67)$$

where $\mu$ is a parameter to be adjusted to give the probability of false alarms $\alpha$.

To determine $\mu$ one may proceed as follows, since we want to compute the probability of inequality of equation (67) under the assumption that $H_o$ is true. In this case, one can approximate the law of $\gamma_{n+k}(-3 < k < 3)$ by a Gaussian distribution with mean a and variance $a/\Delta t_n$ (assuming that $\Delta t_n$ is constant for all k such that $(-3 < k < 3)$). It is easy to check that $(w-4\mu)$ and v will be two zero-mean, independent Gaussian variables whose variances are respectively $84a/\Delta t_n$ and $28a/\Delta t_n$. It is clear now that the random variable:

$$\xi = \frac{\Delta t_n}{84a} [(w - 4u)^2 + 3v^2] \quad (68)$$

follows an $X^2$-distribution with two degrees of freedom. As u/7a is very close to 1 when a is large enough, the probability of equation (67) is well approximated by:

$$\xi \geq \frac{\mu \Delta t_n}{12} \quad (69)$$

The probability of inequality expressed in the above equation is given in statistical tables for every value of $\mu$. For example, $\mu\Delta$ results in a probability of false alarm of 1%. In this case the generalized likelihood ratio test is:

"n belongs to a transition zone"

$$\text{iff } (w - 4u)^2 + 3v^2 \geq \frac{100u}{\Delta t_n}, \quad (70)$$

where u, v and w are defined in equation (66).

Finally, one may remark that since the size of the window (3 ft) will induce the test of equation (70) to choose a transition zone too early, the decision rule will be slightly modified to reduce this effect. The level n will be allocated to a transition zone iff inequality is satisfied for both depths n and n−1. It is to be noticed that this strategy will also decrease the rate of false alarms.

Having discussed the allocation of the detected gamma ray levels to respective zones, we now proceed to the application of the filter process. If it is assumed that the depth n+1 has been allocated to a homogeneous zone. the estimation procedure described above for the next considered depth would not be reliable. To cure this problem, we make the simplifying assumption that $X_{n+1}$ is roughly equal to $X_n$ if the n+1 depth belongs to a homogeneous zone. Extensive testing has shown that this assumption is quite acceptable. Owing to the foregoing assumptions, it is then justified to set:

$$\dot{Q}_n = Q_o, \quad (71)$$

where $Q_o$ is some predetermined "small" diagonal nonnegative matirx. Moreover, a natural estimate of the covariance matrix $\hat{R}_{n+1}$ is the diagonal matrix $R_{n+1}$ whose $i^{th}$ diagonal element is:

$$\dot{R}_{n+1}(i) = \max \left( .5, \frac{1}{\Delta t_{n+1}} \dot{Z}^i_{n+1/n} \right). \quad (72)$$

where $\hat{Z}_{n+1/n}$ denotes the $i^{th}$ component of $\hat{Z}_{n+1+n}$ defined by equation (49). It is to be noticed that $\hat{R}_{n+1}$ will have a much smaller variance than the estimate of equation (48).

We shall now consider the case where the depth n+1 has been allocated to a transition zone. We will slightly modify the estimates $\hat{Q}_n$ and $\hat{R}_{n+1}$ given by equations (52) and (53) to decrease the complexity of the computation. Clearly the problem now amounts to finding more consistent estimates of A.

The crude approximation that:

$$H_{n+k} = H_{n+1}, (1 \leq k \leq 6) \quad (73)$$

is assumed when no factors for tool environmental corrections have to be introduced. Owing to that simplification, one deduces from equation (52) that:

$$EZ_{n+k} = E\dot{Z}_{n+k/n} + H_{n+1}A(E\gamma_{n+k} - E\dot{\gamma}_{n+k/n}), \quad (74)$$

which implies that:

$$\sum_{i=1}^{5} \sum_{j=1}^{3} H_{n+1}(i,j)A_j = 1 \quad (75)$$

where $H_{n+1}(i,j)$ designates the element of the $i^{th}$ row and $j^{th}$ column of the matrix $H_{n+1}$, while $A_j$ denotes the $j^{th}$ component of A. It will be appreciated the respective contributions of Th,U and K to the radiation spectrum are not independent, and it results that only two of them (e.g., Th and K) will have to be estimated, the third being given by the equation. It is to be noticed that a new estimate of $\hat{A}$ will now involve the solution of a $(2 \times 2)$ linear system instead of a $(3 \times 3)$ linear system. The estimate of $Q_n$ being still given by equation (52). For $R_{n+1}$ it is natural to use equation 51 to improve on the estimate provided from equation (48) with the same notation as equation (72):

$$\dot{R}_{n+1}(i) = \max\left[.5, \frac{1}{\Delta t_{n+1}} [\dot{Z}^i_{n+1/n} + B_i(\dot{\gamma}_{n+1} - \gamma_{n+1/n})]\right] \quad (76)$$

where $B_i$ designates the $i^{th}$ component of the 5-dimensional vector B defined by:

$$B = H_{n+1}\dot{A} \quad (77)$$

The estimates of A given by the procedure above are not fully satisfactory everywhere. The main reason being the ill-conditioning of the sensitivity matrix, which may possibly be worsened in case of a relatively low signal-to-noise ratio of the gamma ray level. This problem can be cured once it is realized that the components of A are not distributed uniformly in $R^3$ or in some plane if the constraint of equation (75) is used. Clearly the only possibility is to intergrate into the filter process some geological knowledge about the Th, U, K vertical distribution.

A basic idea of the proposed method relies on the fact that only a few Th, U, K patterns can describe the true vertical profiles. So far the two following patterns have been used, but, of course more can be considered if necessary.

The first one corresponds to a pure uranium anomaly. It follows from equation (41) that $\hat{A}$ is given by:

$$\dot{A} = \left(0, \frac{1}{a}, 0\right)', \quad (78)$$

where a is the sum of the elements of the second column of $H_{n+1}$.

The second pattern corresponds to the homogeneity of ratios conditions. Here one may assume that the three ratios Th/K, Th/u and U/K are constant between depths n and n+1. Using the fact that the ratios at depth n can be estimated with the Kalman filter estimate $\hat{X}_{n/n}$, straightforward calculations show that $\hat{A}$ is given by:

$$\dot{A}' = \frac{1}{\gamma_{n/n}} (X^1_{n/n}, X^2_{n/n}, X^3_{n/n}), \quad (79)$$

where $\hat{X}_{n/n}$ ($i=1, 2, 3$) designates the $i^{th}$ component of $\hat{X}_{n/n}$.

It is easy to compute the two likelihoods of the two preceding assumptions. The minus logarithms of the likehoods are precisely $\phi(A)$ where A is replaced either by equations (78) or (79). The idea is then to use the estimate that will give the smallest value for $\phi(A)$.

Unfortunately, things are more complicated inasmuch as the preceding models do not clearly exhaust all real cases. To cope with this problem, therefore, one should also compute the estimate minimizing equation (53) with no constraint that the components of A are all positive. Let us designate by $\phi$, $\phi_U$, $\phi_+$ and $\phi_R$, the values of $\phi(A)$ corresponding to the maximum likelihood estimates, the maximum likelihood estimate under positivity constraint, the pure uranium anomaly and the homogeneity of ratios condition respectively. Clearly we have:

$$\Phi \leq \Phi_+ \leq \Phi_u \text{ and } \Phi_z \quad (80)$$

The basic idea is then to use the estimates of equations (78) or (79) only if $\phi_U$ and $\phi_R$ are not too far from $\phi$. If this is not the case, we compare $\phi$ and $\phi_+$. If $\phi_+$ is close enough to $\phi$, this means that real anti-correlations are doubtful and we then use the maximum likelihood estimate under positivity constraint. If not, it is then admitted that some real anti-correlations do exist and we use the usual maximum lielihood estimate is employed to derive the estimates of the contents.

I claim:
1. A well logging method comprising:
    deriving a log of gamma radiation detected in selected energy windows by a logging tool passed through a selected borehole depth interval;
    converting the energy windows log into a log of selected subsurface gamma radiation emitting materials through a process comprising the use of a filter which is adaptive rather than constrained to a fixed lag and is allowed to vary with borehole depth in accordance with the way in which detected gamma radiation changes with depth in the borehole to thereby produce a filtered log of said materials; and
    producing a tangible representation of said filtered log.
2. A well logging method as in claim 1 in which said filter for a given borehole depth level is determined by changes in the total detected gamma radiation as between depth levels in the vicinity of said given depth level.
3. A well logging method as in claim 2 in which said filter for a given borehole depth level is determined by changes in the total detected gamma radiation between the given depth level and the depth level preceding said given depth level.
4. A well logging method as in claim 2 in which a sample of the materials log for a given borehole depth level is produced through modifying the sample for the preceding depth level by a filtered contribution of the difference between a log sample for the given depth level and a windows log sample produced from the materials log sample for the preceding depth level and known logging tool characteristics.

5. A well logging method as in any one of the claims 1 through 4 in which the deriving step comprises deriving a log of gamma radiation detected in five respective energy windows and the converting step comprises converting the energy windows log into a log of the concentrations of each of thorium, uranium and potassium along the selected borehole depth interval.

6. A well logging method as in claim 1 in which the filter for a given depth level in the borehole is a function of an estimate of the statistical variations in the windows log measurements in the vicinity of the given depth level and of an estimate of the geological noise in the vicinity of the given depth level.

7. A well logging method as in claim 6 in which said filter for a given depth level in the borehole is a function of an estimate of fluctuations in estimates of said materials log for previous borehole depth levels.

8. A well logging method as in claim 1, 6 or 7 including subjecting the filtered log of said selected subsurface materials to selected fixed lag filtering to thereby produce a further-filtered log of said selected subsurface materials.

9. A well logging method as in claim 1, 6 or 7 including determining whether a given borehole depth level is in a homogeneous zone or in a transition zone and changing the nature of the filter for said depth level accordingly.

10. A well logging method as in claim 1 in which the filter determining an estimate of the log of said subsurface materials for a given depth level in the borehole is structured to accord greater weight to the estimate for the previous depth level with lesser change in the total detected gamma radiation in the vicinity of the given borehole depth level and otherwise to accord greater weight to the windows log for the given depth level.

11. A well logging method as in claim 1 in which the deriving step comprises passing said logging tool through said borehole interval.

12. A well logging system comprising:
means for deriving a log of gamma radiation detected in selected energy windows by a logging tool passed through a selected borehole interval; and
means for converting said energy windows log into a log of selected subsurface gamma radiation emitting materials through a process comprising the use of a filter which is adaptive rather than constrained to a fixed lag and is allowed to vary with borehole depth in accordance with selected characteristics of the way in which detected gamma radiation changes with depth in the borehole to thereby produce a filtered log of said materials, and for producing a tangible representation of said filtered log.

13. A well logging method comprising:
deriving a log of gamma radiation detected in selected energy windows by a logging tool passed through a selected borehole depth interval containing borehole fluid having at least one of a gamma ray emitting substance and a substance which is a strong absorber of gamma rays, said borehole depth interval extending through subsurface earth formations which are likely to include selected gamma radiation emitting materials;
converting the energy windows log into a log of said selected subsurface gamma radiation emitting materials along the selected borehole depth interval by subjecting the windows log to a process using a filter which is adaptive rather than constrained to a fixed lag and is allowed to vary with borehole depth as a function of running estimates of at least one of said gamma ray emitting substance and strong absorber in the borehole fluid to thereby produce a filtered log of said selected subsurface materials; and
producing a tangible representation of said filtered log.

14. A well logging method as in claim 13 in which the converting step comprises using said filter to produce a log of the changes with borehole depth of said strong absorber of gamma rays in the borehole fluid; and
producing a tangible representation of said log of said gamma ray absorber in the borehole fluid.

15. A well logging method as in claim 13 in which the converting step comprises using said filter to produce a log of the changes with borehole depth of said gamma ray emitting substance in the borehole fluid; and
producing a tangible representation of said log of said gamma ray emitting substance in the borehole fluid.

16. A well logging method as in claim 13, 14 or 15 wherein:
said gamma ray emitting substance in the borehold fluid contains a material which is the same as at least one of said gamma radiation emitting materials in the subsurface formations through which the borehole extends.

17. A well logging method as in claim 16 in which said strong absorber of gamma rays in the borehole fluid comprises at least barite.

18. A well logging method as in claim 13, 14 or 15 in which said selected subsurface gamma radiation emitting materials include at least thorium, uranium, and postassium.

19. A well logging method as in claim 13, 14 or 15 in which said selected energy windows comprise at least five energy windows.

20. A well logging method as in claim 13, 14 or 15 in which said adaptive filter varies with borehole depth as a function of an estimate of the effect of the size of the borehole on the detected gamma radiation.

21. A well logging system comprising:
means for deriving a log of gamma radiation detected in selected energy windows by a logging tool passed through a selected borehole interval containing borehole fluid having at least one of a gamma ray emitting substance and a substance which is a strong absorber of gamma rays, said borehole interval extending through subsurface earth formations;
means for converting said energy windows log into a log of said selected subsurface gamma radiation emitting materials along the selected borehole interval by subjecting the windows log to a process using a filter which is adaptive rather than constrained to a fixed lag and is allowed to vary with borehole depth as a function of running estimates of at least one of said gamma ray emitting substance and strong absorber in the borehole fluid to thereby produce a filtered log of said selected subsurface materials; and
means for producing a tangible representation of said filtered log.

22. A well logging system as in claim 21 in which the converting means comprise means for using said adaptive filter to produce a log of the changes with borehole depth of said gamma ray emitting substance and said strong absorber of gamma rays in the borehole fluid.

23. A well logging system as in claim 21 or 22 in which said adaptive filter varies with borehole depth as a function of estimates of the effects of borehole size on detected gamma radiation.

24. A well logging method comprising:
deriving measurements of gamma radiation detected in selected energy windows at selected depth levels in a borehole;
using the energy windows measurements for a given depth level to produce estimates of the concentrations of selected gamma ray emitting materials in the nearby subsurface formations and filtering said estimates through a process making use of a filter which is adaptive rather than constrained to a fixed lag and which is a function at least of an estimate of statistical variations in concentrations estimates for at least one preceding depth level, of estimates of geological noise in concentrations estimates for at least one selected depth level and of estimates of statistical variations in the windows measurements for at least one selected depth level, and repeating said using and filtering steps for other depth levels in the borehole to thereby produce filtered estimates forming a log of the concentrations of said materials in the subsurface formations along the borehole; and
producing a tangible representation of said log.

25. A well logging system as in claim 24 in which said filter for any given depth level after the first depth level is a function of an estimate of the statistical variations in the filtered concentrations estimate for the immediately preceding depth level, of estimates of geological noise in the concentrations estimates for the immediately preceding depth level and of estimates of statistical variations in the windows measurements for the given depth level.

26. A well logging method as in claim 25 in which the deriving step comprises passing a logging tool through the borehole, and the filtering step comprises using a filter which is further a function of selected empirically measured characteristics of said tool.

27. A well logging method as in claim 24 in which the borehole contains borehole fluid having at least one of a gamma ray emitting substance and a substance which is a strong absorber of gamma rays and in which the filter for a given depth level is further a function of estimates of the concentrations, at or in the vicinity of said given depth level, of at least one of said gamma ray emitting substance and said strong absorber in the borehole fluid.

28. A well logging method as in claim 27 in which the filter is a function of both the concentration of said substance and the concentration of said absorber.

29. A method as in claim 28 in which the filter for a given depth level is further a function of the borehole size at or in the vicinity of the given depth level and of the tool size.

30. A well logging method as in claim 27 including the step of using the windows measurements for the given depth level and/or for one or a few preceding depth levels to derive an estimate of the concentration in the borehole fluid in the vicinity of the given depth level of at least one of said gamma ray emitting substance and said strong absorber.

31. A well logging method as in claim 30 in which the deriving step comprises deriving an estimate of the concentrations of both the gamma ray emitting substance and the strong absorber.

32. A well logging method as in claim 24 comprising subjecting the filtered log to selected fixed lag filtering to thereby produce a further filtered log of the concentrations of said selected gamma ray emitting materials in the subsurface formations along the borehole.

* * * * *